United States Patent
Shin et al.

(10) Patent No.: US 10,061,388 B2
(45) Date of Patent: Aug. 28, 2018

(54) METHOD AND APPARATUS FOR PROCESSING USER INPUT

(71) Applicant: SAMSUNG ELECTRONICS CO., LTD., Suwon-si (KR)

(72) Inventors: Changwoo Shin, Hwaseong-si (KR); Keun Joo Park, Seoul (KR); Kyoobin Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 24 days.

(21) Appl. No.: 14/676,391

(22) Filed: Apr. 1, 2015

(65) Prior Publication Data

US 2016/0048215 A1    Feb. 18, 2016

(30) Foreign Application Priority Data

Aug. 18, 2014  (KR) .................. 10-2014-0107173

(51) Int. Cl.
| | |
|---|---|
| *G06F 3/01* | (2006.01) |
| *G06F 3/0488* | (2013.01) |
| *H04M 1/725* | (2006.01) |
| *G06F 3/0481* | (2013.01) |
| *G06F 3/042* | (2006.01) |

(52) U.S. Cl.
CPC ............ *G06F 3/017* (2013.01); *G06F 3/042* (2013.01); *G06F 3/0488* (2013.01); *G06F 3/04817* (2013.01); *H04M 1/72519* (2013.01); *H04M 2250/22* (2013.01)

(58) Field of Classification Search
USPC .................................. 345/156, 358; 715/863
See application file for complete search history.

(56) References Cited

U.S. PATENT DOCUMENTS

| | | | |
|---|---|---|---|
| 6,718,187 B1* | 4/2004 | Takagi | G02B 27/01 379/420.01 |
| 8,255,971 B1 | 8/2012 | Webb et al. | |
| 8,364,489 B2 | 1/2013 | Grobauer et al. | |
| 8,521,526 B1 | 8/2013 | Lloyd et al. | |
| 2008/0129686 A1 | 6/2008 | Han | |
| 2008/0168290 A1* | 7/2008 | Jobs | G06F 1/26 713/324 |
| 2011/0061689 A1 | 3/2011 | Mitchell et al. | |
| 2011/0320949 A1* | 12/2011 | Ohki | G06F 17/245 715/727 |
| 2013/0151250 A1 | 6/2013 | VanBlon | |
| 2013/0170706 A1 | 7/2013 | Mon et al. | |
| 2013/0204627 A1 | 8/2013 | Schalk | |

(Continued)

FOREIGN PATENT DOCUMENTS

| | | |
|---|---|---|
| KR | 10-0297514 A | 8/2001 |
| KR | 10-0717385 B1 | 5/2007 |

(Continued)

*Primary Examiner* — Jennifer Mehmood
*Assistant Examiner* — Deeprose Subedi
(74) *Attorney, Agent, or Firm* — Sughrue Mion, PLLC

(57) ABSTRACT

A user input processing method is provided. The user input processing method determines, based on a recognition reliability of a user input for a function, a delay time and whether the function is to be performed, the function being determined in advance, and controls the function based on the delay time and whether the function is to be performed.

35 Claims, 25 Drawing Sheets

(56) References Cited

U.S. PATENT DOCUMENTS

| | | | | |
|---|---|---|---|---|
| 2013/0271360 A1* | 10/2013 | MacDougall | ..... | H04M 1/72519 345/156 |
| 2013/0328763 A1* | 12/2013 | Latta | ....................... | G06F 3/017 345/156 |
| 2015/0205359 A1* | 7/2015 | Feng | ....................... | G06F 3/017 715/863 |
| 2015/0220149 A1* | 8/2015 | Plagemann | ............. | G06F 3/017 715/856 |
| 2015/0220150 A1* | 8/2015 | Plagemann | ............. | G06F 3/017 715/856 |
| 2017/0302780 A1* | 10/2017 | Rathod | ............. | H04M 1/72547 |

FOREIGN PATENT DOCUMENTS

| KR | 10-0930249 B1 | 12/2009 |
|---|---|---|
| KR | 10-2011-0086492 A | 7/2011 |
| KR | 10-1131278 B1 | 3/2012 |

* cited by examiner

| Function | Recognition reliability | Delay time |
|---|---|---|
| 1721 → ➡ | 55% | 3 sec |
| 1723 → ⬆ | 45% | 3 sec |

| Function | Recognition reliability | Delay time |
|---|---|---|
| 1921 → | 40% | 2 sec |
| 1923 ↑ | 40% | 2 sec |

METHOD AND APPARATUS FOR PROCESSING USER INPUT

CROSS-REFERENCE TO RELATED APPLICATION

This application claims priority from Korean Patent Application No. 10-2014-0107173, filed on Aug. 18, 2014 in the Korean Intellectual Property Office, the disclosure of which is incorporated by reference herein in its entirety.

BACKGROUND

1. Field

Methods and apparatuses consistent with exemplary embodiments relate to processing a user input.

2. Description of the Related Art

Human-computer interaction (HCI) technology may enhance an interaction between a user and a computer. A user's intention may be transferred to a computer using various user interfaces that may be configured, for example, to recognize functions via a vision sensor. The user interfaces may be implemented using hardware components, software components, or a combination thereof.

Due to widespread utilization of cameras, microphones, and other components in electronic apparatuses, user interfaces may further enhance an interaction between a user and a computer. Accordingly, diverse functions of electronic apparatuses may be fully utilized.

SUMMARY

Exemplary embodiments may address at least the above problems and/or disadvantages and other disadvantages not described above. Also, the exemplary embodiments are not required to overcome the problems and/or disadvantages described above, and an exemplary embodiment may not overcome any of the problems and/or disadvantages described above.

According to an aspect of an exemplary embodiment, there is provided a user input processing method including determining, based on a recognition reliability of a user input for a function determined in advance, a delay time and whether the function is to be performed, and controlling the function based on the delay time and whether the function is to be performed.

When the recognition reliability is less than a first threshold and greater than a second threshold, the delay time may be determined based on a distance between the recognition reliability and a third threshold.

The controlling may include at least one of performing the function after the delay time, controlling a performance speed of the function so that the function is performed during the delay time, reducing the performance speed during the delay time, and restoring the performance speed when the delay time has elapsed, and maintaining, during a waiting time, a state enabling return to a state before the function was performed when the function is performed.

The user input processing method may further include feeding back to a user at least one of a remaining delay time and whether the function is to be performed, during the delay time. The user input processing method may further include providing a user with an interface for an input associated with whether the function is to be performed, during the delay time.

The user input processing method may further include, when the input associated with whether the function is to be performed is received via the interface, controlling the function based on the input associated with whether the function is to be performed, instead of waiting until the delay time has elapsed. The user input processing method may further include, when the input associated with whether the function is to be performed is received via the interface, updating at least one of a first parameter and a second parameter based on the recognition reliability, the first parameter being used to determine the delay time, and the second parameter being used to determine whether the function is to be performed.

According to an aspect of another exemplary embodiment, there is provided a user input processing method including acquiring recognition reliabilities of a user input, corresponding to a plurality of functions, determining, based on the recognition reliabilities, delay times corresponding to the functions and whether the functions are to be performed, and controlling the functions based on the delay times and whether the functions are to be performed.

The controlling may include detecting a recognition reliability that is greater than a first threshold, among the recognition reliabilities, and performing a function corresponding to the detected recognition reliability after a delay time of the function which corresponds to the detected recognition reliability has elapsed.

The controlling may include detecting recognition reliabilities less than the first threshold and greater than a second threshold, among the recognition reliabilities, determining a representative delay time based on delay times of functions corresponding to the detected recognition reliabilities, and controlling the functions corresponding to the detected recognition reliabilities, based on the representative delay time and whether the functions corresponding to the detected recognition reliabilities are to be performed.

According to an aspect of another exemplary embodiment, there is provided a user input processing apparatus, including a determiner configured to determine, based on a recognition reliability of a user input for a function determined in advance, a delay time and whether the function is to be performed, and a controller configured to, after the delay time, control the function based on whether the function is to be performed.

According to an aspect of another exemplary embodiment, there is provided a user input processing apparatus including an acquirer configured to acquire recognition reliabilities of a user input, corresponding to a plurality of functions, a determiner configured to determine, based on the recognition reliabilities, delay times corresponding to the functions and whether the functions are to be performed, and a controller configured to control the functions, based on the delay times and whether the functions are to be performed.

According to yet another exemplary embodiment, there may be provided a user gesture input processing method, including inputting a gesture performed by a user, the gesture corresponding to a pre-set function to be performed by a device; determining a recognition reliability of the gesture; based on the determined recognition reliability, setting a delay time and whether the function is to be performed; and controlling the function based on the delay time and whether the function is to be performed.

BRIEF DESCRIPTION OF THE DRAWINGS

The above and/or other aspects will become apparent and more readily appreciated from the following detailed description of certain exemplary embodiments, taken in conjunction with the accompanying drawings of which.

DETAILED DESCRIPTION

Figure 1:
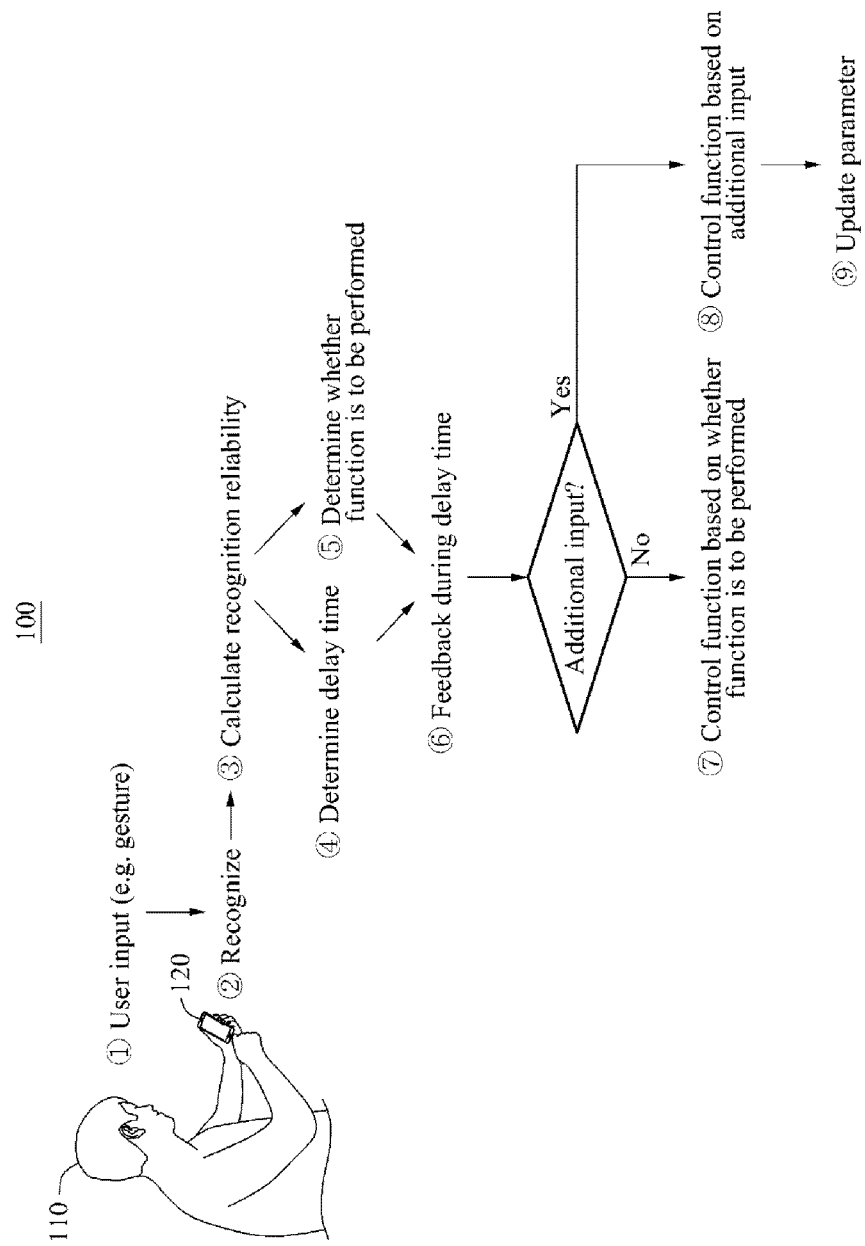
FIG. 1 illustrates a user input processing system according to an exemplary embodiment.

Reference will now be made in detail to exemplary embodiments, examples of which are illustrated in the accompanying drawings, wherein like reference numerals refer to the like elements throughout. Exemplary embodiments to be described below may be applied to a user interfacing scheme of recognizing a user input and processing the recognized user input.

FIG. 1 illustrates a user input processing system according to an exemplary embodiment. In a user input processing system 100 of FIG. 1, a user input processing apparatus 120 may receive a user input. The user input processing apparatus 120 may be configured to process a user input, and may comprehensively include, for example, a mobile device (for example, a mobile phone, a smartphone, a personal digital assistant (PDA), or a tablet computer), a wearable device (for example, a smart watch, or smart glasses), smart home appliances (for example, a smart television (TV), a smart refrigerator, or a smart door lock), a typical computing device (for example, a laptop computer, or a personal computer (PC)), or a dedicated-use computing device (for example, a navigation device for vehicles, an automatic teller machine (ATM), or a ticket vending machine (TVM)). The user input processing apparatus 120 may include various modules configured to process a user input, and the various modules may be implemented using hardware modules, software modules or a combination thereof.

The user input processing apparatus 120 may receive a user input, using various schemes. For example, the user input processing apparatus 120 may receive image data including a user's gesture or a user's motion, by using a vision sensor. The user input processing apparatus 120 may receive event data generated due to a user's motion, by using an event-based vision sensor. The user input processing apparatus 120 may receive gyro data corresponding to a user's gesture, by using a gyro sensor. The user input processing apparatus 120 may receive acceleration data generated due to a user's motion, by using an acceleration sensor. The user input processing apparatus 120 may receive touch data corresponding to a user's touch, by using a touch sensor. The user input processing apparatus 120 may receive vibration data corresponding to a vibration intended by a user, by using a vibration sensor. The user input processing apparatus 120 may receive audio data corresponding to a voice command of a user, by using a microphone. The user input processing apparatus 120 may receive biometric data of a user, for example an electromyogram (EMG), a brainwave, a heartbeat, and the like, by using a biometric sensor.

The user input processing apparatus 120 may recognize the user input, and may estimate an intention or a state of a user 110. The user input processing apparatus 120 may determine whether the user input is received for a function. The function may be predetermined. For example, the user input processing apparatus 120 may recognize a user's gesture, a user's motion, a user's voice, a user's writing, and the like. The user input processing apparatus 120 may calculate a recognition reliability of the user input corresponding to the function. The recognition reliability may refer to a degree to which a result obtained by recognizing the user input is matched to a pattern corresponding to the function. A pattern corresponding to a function may be, for example, a user operation pattern corresponding to the function. The user operation pattern may be preset. For example, the recognition reliability may have a value that is equal to or greater than "0" and equal to or less than "1," or a value that is equal to or greater than 0% and equal to or less than 100%.

The following exemplary embodiments may be applied to at least one function. For convenience of description, an operation of a user input processing apparatus in an example in which a single function is determined in advance, will be described, prior to describing an example in which a plurality of functions are determined in advance.

In an example, when a camera application is being executed, a "capturing" function may be determined in advance. In this example, the user input processing apparatus 120 may calculate a recognition reliability indicating a degree to which a user input is matched to a pattern corresponding to the "capturing" function. Additionally, when a "flashing on" function is determined in advance, the user input processing apparatus 120 may calculate a recognition reliability indicating a degree to which a user input is matched to a pattern corresponding to the "flashing on" function.

In another example, when a call is incoming, an incoming call connection function may be determined in advance. In this example, the user input processing apparatus 120 may calculate a recognition reliability indicating a degree to which a user input is matched to a pattern corresponding to the incoming call connection function. Additionally, when an incoming call rejection function is determined in advance, the user input processing apparatus 120 may calculate a recognition reliability indicating a degree to which a user input is matched to a pattern corresponding to the incoming call rejection function. Furthermore, when a silent incoming call function is determined in advance, the user input processing apparatus 120 may calculate a recognition reliability indicating a degree to which a user input is matched to a pattern corresponding to the silent incoming call function. In addition, when a text message sending function is determined in advance, the user input processing apparatus 120 may calculate a recognition reliability indicating a degree to which a user input is matched to a pattern corresponding to the text message sending function. The patterns that correspond to the various functions may be set by a user in advance, or set by, for example, a manufacturer of the device. For example, the manufacturer of the device may set default patterns for different functions, and the user may use the default patterns or may modify or change the default patterns for a certain function to a pattern desired by the user. For example, the user may set a certain gesture pattern (e.g., a circle gesture) to correspond to the incoming call connection function, etc.

The user input processing apparatus 120 may select one of a plurality of functions based on a user input, which will be further described later. An operation of the user input processing apparatus 120 to be performed when a plurality of functions are used will be further described below.

As described above, the user input processing apparatus 120 may directly recognize the user input and calculate the recognition reliability, however, there is no limitation thereto. Accordingly, exemplary embodiments may be modified so that the recognition reliability may be calculated by apparatuses other than the user input processing apparatus 120, for example a server, and that the calculated recognition reliability may be provided to the user input processing apparatus 120. Additionally, exemplary embodiments may be modified so that the user input processing apparatus 120 may operate through distributed computing between devices, and that a result of the distributed computing may be combined.

The user input processing apparatus 120 may determine a delay time and whether a function is to be performed, based on the recognition reliability. The delay time may be used to provide feedback to a user. During the delay time, the user input processing apparatus 120 may feed back to the user 110 at least one of a target function, whether a function is to be performed, and a remaining delay time. The target function may be information to indicate a function of which a recognition reliability is calculated. The target function may be information to indicate a recognized function. Whether the function is to be performed may correspond to information used to indicate whether the function is to be automatically performed, and the remaining delay time may indicate a time remaining in the delay time. For example, when the delay time elapses, the user input processing apparatus 120 may interrupt providing of feedback to the user 110.

The user input processing apparatus 120 may provide the user 110 with an interface for an input associated with whether a function is to be performed, during the delay time. The input may include, for example, at least one of an input to confirm a determination result obtained by the user input processing apparatus 120, and an input to change the determination result. The determination result may be information to determine whether the function is to be performed.

The user input processing apparatus 120 may determine whether an additional input is received through the interface during the delay time.

When the additional input is not received from the user 110 during the delay time, the user input processing apparatus 120 may control a function based on whether the function is to be performed. When whether the function is to be performed is determined as a first value indicating positiveness, the user input processing apparatus 120 may perform the function after the delay time elapses. For example, when a function of turning a page on a screen is determined as a target function, the user input processing apparatus 120 may delay performing the function of turning the page on the screen until the delay time elapses. The user input processing apparatus 120 may perform the function of turning the page on the screen after the delay time elapses.

The user input processing apparatus 120 may perform the function, and may maintain a state in which the user input processing apparatus 120 is enabled to return to a state before the function is performed, during a waiting time. The waiting time may refer to a period of time during which it is allowed to cancel a function once execution of the function has been completed. The waiting time may be determined using substantially the same scheme as a scheme of determining the delay time.

For example, when a function of turning a page on a screen is determined as a target function, the user input processing apparatus 120 may perform the function of turning a page, and may wait until an additional input is received from a user during the waiting time. When an additional input corresponding to a cancel command is detected during the waiting time, the user input processing apparatus 120 may return to a state before the function of turning a page was performed.

The user input processing apparatus 120 may perform a function, while controlling a performance speed of the function during the delay time. The user input processing apparatus 120 may provide the user 110 with indirect feedback to indirectly notify the user 110 that a recognition reliability of a user input is not sufficiently high, by controlling the performance speed of the function during the delay time.

In an example, the user input processing apparatus 120 may control a function to be performed over a delay time. When a page turning function of turning a page on a screen is determined as a target function, the user input processing apparatus 120 may control the page turning function so that a page may be slowly turned over the delay time. In another example, the user input processing apparatus 120 may reduce a performance speed of a function during a delay time. In this example, when the delay time elapses, the user input processing apparatus 120 may restore the performance speed. When a page turning function of turning a page on a screen is determined as a target function, the user input processing apparatus 120 may control the page turning function so that a page may be slowly turned on the screen during the delay time and that the page may be turned at a normal speed after the delay time elapses. A user may detect that the page is turned at a speed lower than the normal speed during the delay time, and may recognize that the recognition reliability of the user input is not sufficiently high.

When whether the function is to be performed is determined as a second value indicating negativeness, the user input processing apparatus 120 may not perform the function even after the delay time elapses. When whether a function is to be performed is determined as the second value, and when an additional input is not received from a user during the delay time, the user input processing apparatus 120 may determine that the user input is not matched to an intention or a state of the user, and may not substantially respond to the user input. For example, the user input processing apparatus 120 may return to a state before the user input was received.

When an additional input is received from the user 110 during the delay time, the user input processing apparatus 120 may control a function according to the additional input. In an example, when a command to confirm performing of a recognized function or a function whose recognition reliability is calculated is additionally input through a provided interface during the delay time, the user input processing apparatus 120 may perform the function, instead of waiting until the delay time elapses. In another example, when a command to reject performing of the recognized function or the function whose recognition reliability is calculated is additionally input through the provided interface during the delay time, the user input processing apparatus 120 may not perform the function. In the above examples, the function may be recognized or may correspond to a calculated recognition reliability. The user input processing apparatus 120 may not wait until the delay time elapses, and may return to a state before the user input was received. In response to the additional input, the user input processing apparatus 120 may not wait until the delay time elapses, and may interrupt providing feedback to the user.

To recognize an additional input through the provided interface during the delay time, the user input processing apparatus 120 may use a recognition reliability of the additional input. For example, the user input processing apparatus 120 may calculate the recognition reliability of the additional input, and may process the additional input based on the calculated recognition reliability.

When an additional input is received from the user 110 during the delay time, the user input processing apparatus 120 may update parameters based on the recognition reliability and/or the additional input. For example, the user input processing apparatus 120 may update at least one of a first parameter and a second parameter. The first parameter may be used to determine a delay time, and the second parameter may be used to determine whether a function is to be performed. An example of updating a parameter will be further described below.

As described above, exemplary embodiments may provide a technology for minimizing inconvenience caused by misrecognition of a user input by providing intuitive feedback to a user. Additionally, exemplary embodiments may provide a technology for cancelling performing of a function or for returning to a state before the function was performed in an example of an incorrect user input or misrecognition of a user input.

Figure 2:
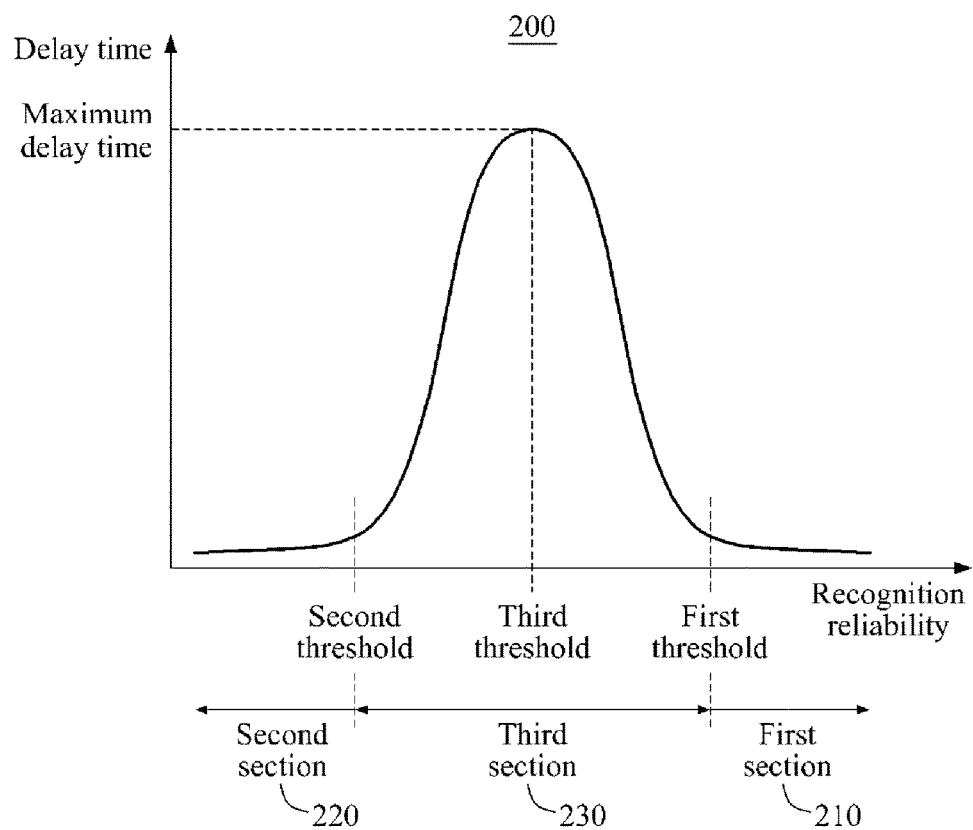
FIG. 2 is a graph illustrating an example of an associative relationship between a recognition reliability and a delay time according to an exemplary embodiment.

FIG. 2 illustrates an example of an associative relationship between a recognition reliability and a delay time according to an exemplary embodiment. Referring to FIG. 2, the associative relationship is represented by a graph 200. In the graph 200, an x-axis represents the recognition reliability, and a y-axis represents the delay time.

Referring to the graph 200, the delay time may be determined to have a low value in a first section 210 in which a value of the recognition reliability is greater than a first threshold. For example, in the first section 210, the delay time may be determined to have a value of "0" or a value substantially close to "0." In this example, a user input processing apparatus according to an exemplary embodiment may determine that a value of a recognition reliability corresponding to a function is included in the first section 210, and accordingly may perform the function substantially without a delay.

The delay time may also be determined to have a low value in a second section 220 indicating a low recognition reliability. In the second section 220, a value of the recognition reliability may be less than a second threshold, and the delay time may have a value of "0" or a value substantially close to "0." The user input processing apparatus may determine that a value of a recognition reliability corresponding to a function is included in the second section 220, and accordingly may determine not to perform the function, substantially without a delay.

In addition, the delay time may be determined based on a distance between the recognition reliability and a third threshold in a third section 230 indicating an intermediate level of the recognition reliability. In the third section 230, a value of the recognition reliability may be less than the first threshold and greater than the second threshold. In the third section 230, when the value of the recognition reliability approaches the third threshold, the delay time may be determined to increase. Conversely, when the value of the recognition reliability moves away from the third threshold, the delay time may be determined to decrease. For example, when the value of the recognition reliability is equal to the third threshold, the delay time may have a maximum value. The user input processing apparatus may determine that a value of a recognition reliability corresponding to a function is included in the third section 230, and accordingly may determine a delay time based on the recognition reliability. The user input processing apparatus may feed back to a user at least one of a target function, whether a function is to be performed, and a remaining delay time, while delaying performing of a function during the delay time.

The first threshold may be included in the first section 210 or the third section 230. For example, when the first threshold is included in the first section 210, the user input processing apparatus may determine the recognition reliability to have a value equal to the first threshold, and may determine the delay time to have a value of "0" or substantially close to "0." When the first threshold is included in the third section 230, the user input processing apparatus may determine the recognition reliability to have a value equal to the first threshold, and may determine the delay time based on a distance between the first threshold and the third threshold.

The second threshold may be included in the second section 220 or the third section 230. For example, when the second threshold is included in the second section 220, the user input processing apparatus may determine the recognition reliability to have a value equal to the second threshold, and may determine the delay time to have a value of "0" or substantially close to "0." When the second threshold is included in the third section 230, the user input processing apparatus may determine the recognition reliability to have a value equal to the second threshold, and may determine the delay time based on a distance between the second threshold and the third threshold.

The third threshold may be used to determine whether a function is to be performed. For example, when the recognition reliability is greater than the third threshold, the user input processing apparatus may determine whether the function is to be performed as a first value indicating positiveness. When the recognition reliability is less than the third threshold, the user input processing apparatus may determine whether the function is to be performed as a second value indicating negativeness. The third threshold may be included in the first value indicating positiveness or in the second value indicating negativeness.

Whether a function is to be performed may be determined based on a fourth threshold different from the third threshold. Hereinafter, for convenience of description, whether a function is to be performed may be assumed to be determined based on the third threshold.

Figure 3:
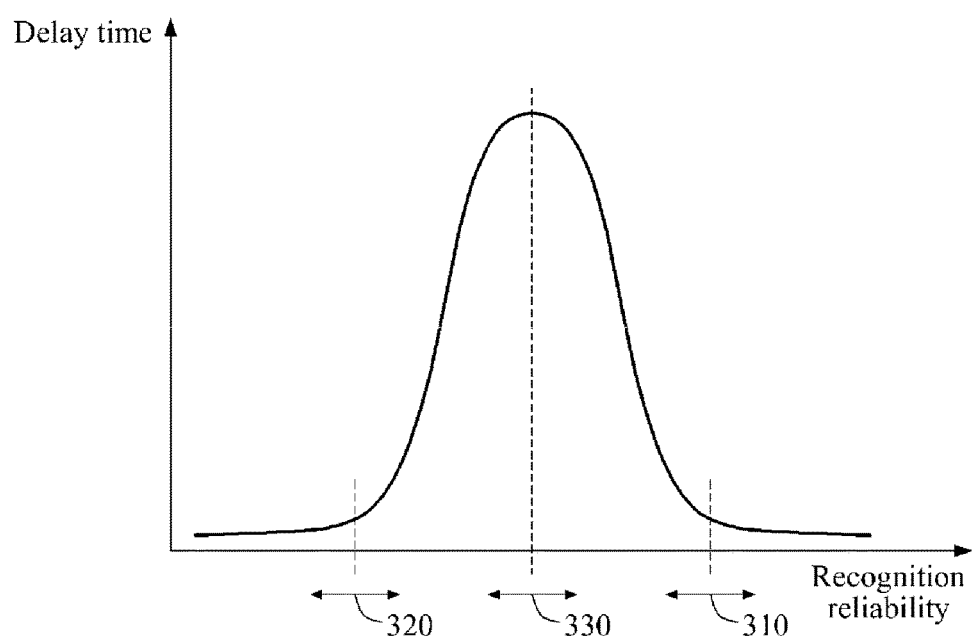
FIGS. 3 and 4 illustrate examples of updating a parameter according to an exemplary embodiment.
Figure 4:
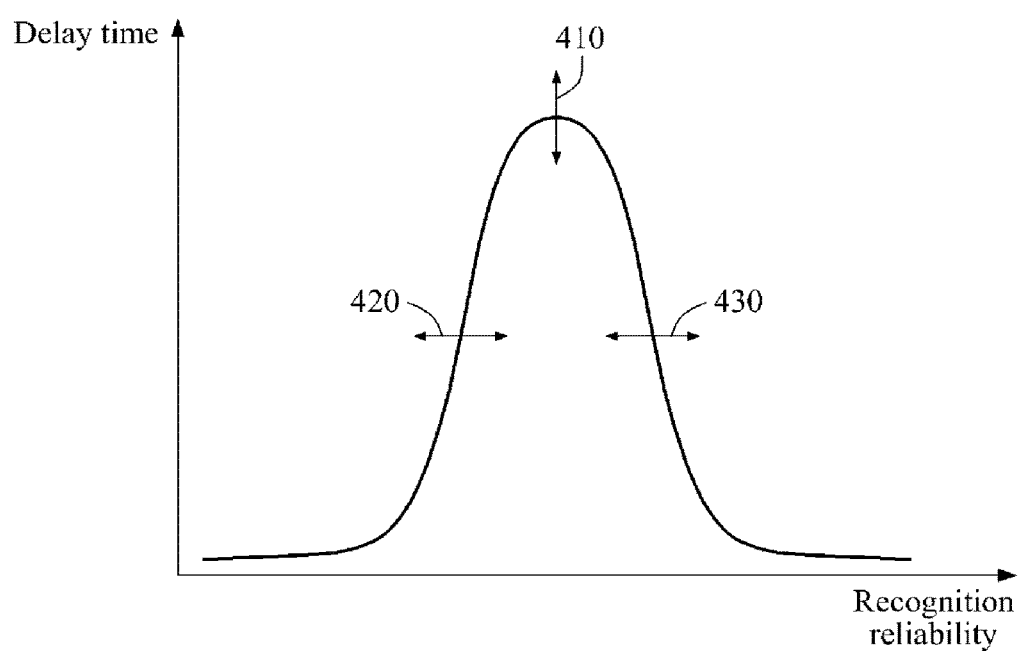

FIGS. 3 and 4 illustrate examples of updating a parameter according to an exemplary embodiment. Referring to FIG. 3, the parameter may include, for example, a first parameter used to determine a delay time, and/or a second parameter used to determine whether a function is to be performed. The first parameter may include a first threshold, a second threshold, and a third threshold. The second parameter may include the third threshold or a fourth threshold.

A user input processing apparatus according to an exemplary embodiment may adaptively update the first parameter and/or the second parameter. For example, the user input processing apparatus may adjust the first threshold, the second threshold, or the third threshold, as indicated by bidirectional arrows 310, 320, or 330, respectively, based on an additional input received from a user during a delay time. When the second parameter includes the fourth threshold, the user input processing apparatus may adjust the fourth threshold, based on the additional input, although not illustrated in the drawings.

The user input processing apparatus may update the first parameter and/or the second parameter, despite an additional input not being received from a user during a delay time. For example, when an additional input is not received from a user during a delay time, the user input processing apparatus may update the first parameter and/or the second parameter, based on whether a function is to be performed. Whether the function is to be performed may be fed back to the user. Hereinafter, for convenience of description, a parameter may be updated based on the additional input received from the user during the delay time, however, there is no limitation thereto.

When a plurality of functions are used, the user input processing apparatus may update a third parameter and/or a fourth parameter, based on a recognition reliability corresponding to a function that is selected by an additional input. The third parameter may be used to determine a delay time of a function that is not selected by the additional input. The fourth parameter may be used to determine whether a function is to be performed.

Referring to FIG. 4, the first parameter may include a maximum delay time, a left curvature, and a right curvature. The user input processing apparatus may adaptively update the first parameter. For example, the user input processing apparatus may adjust the maximum delay time, the left curvature, or the right curvature, as indicated by bidirectional arrows 410, 420, or 430, respectively, based on an additional input received from a user during a delay time.

Figure 5:
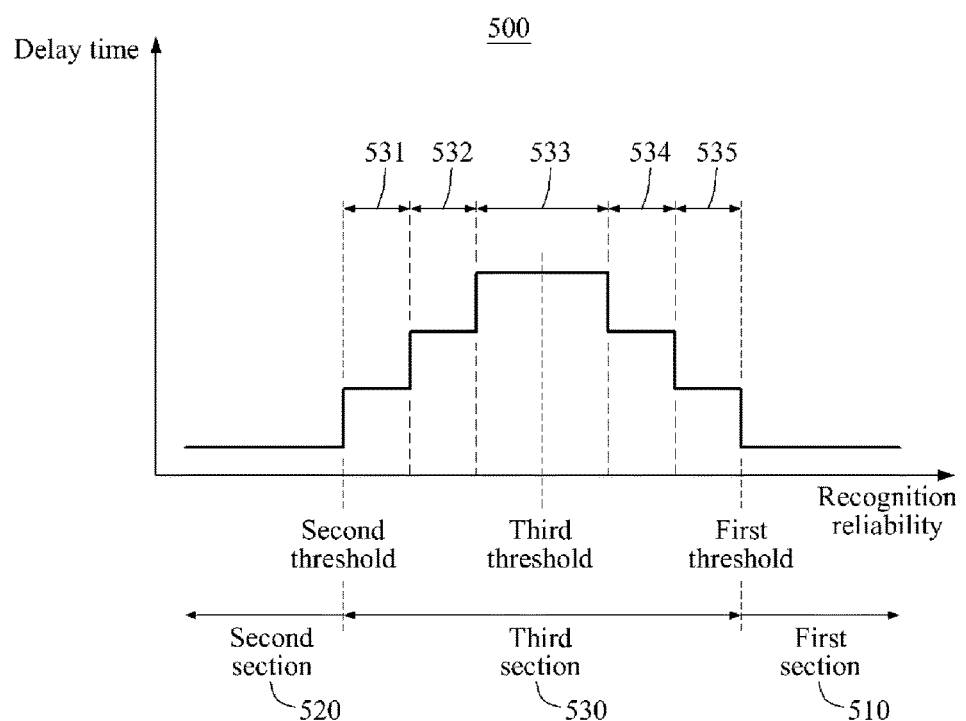
FIG. 5 is a graph illustrating another example of an associative relationship between a recognition reliability and a delay time according to an exemplary embodiments.

FIG. 5 illustrates another example of an associative relationship between a recognition reliability and a delay time according to an exemplary embodiment. Referring to FIG. 5, the associative relationship is represented by a graph 500. In the graph 500, an x-axis represents the recognition reliability, and a y-axis represents the delay time.

Referring to the graph 500, the delay time may be determined to have a low value in a first section 510 in which a value of the recognition reliability is greater than a first threshold. For example, in the first section 510, the delay time may be determined to have a value of "0" or a value substantially close to "0."

The delay time may also be determined to have a low value in a second section 520 indicating a low recognition reliability. In the second section 520, a value of the recognition reliability may be less than a second threshold, and the delay time may have a value of "0" or a value substantially close to "0."

In addition, the delay time may be determined based on a distance between the recognition reliability and a third threshold in a third section 530 indicating an intermediate level of the recognition reliability. In the third section 530, a value of the recognition reliability may be less than the first threshold and greater than the second threshold. The third section 530 may be quantized into discrete sub-sections 531, 532, 533, 534, and 535. The discrete sub-sections may also be referred to as bins. The third section 530 may be quantized into five sub-sections, as shown in FIG. 5, however, there is no limitation thereto. Accordingly, a number of sub-sections into the third section 530 is quantized may be variously changed.

In a sub-section of the third section 530, when the value of the recognition reliability approaches the third threshold, the delay time may be determined to increase. Conversely, when the value of the recognition reliability moves away from the third threshold, the delay time may be determined to decrease. For example, when a value of the recognition reliability is included in the sub-section 533 that is closest to the third threshold, the delay time may have a maximum value.

The first threshold may be included in the first section 510 or the third section 530. For example, when the first threshold is included in the first section 510, the user input processing apparatus may determine the recognition reliability to have a value equal to the first threshold, and may determine the delay time to have a value of "0" or substantially close to "0." When the first threshold is included in the third section 530, the user input processing apparatus may determine the recognition reliability to have a value equal to the first threshold, and may determine the delay time based on the sub-section 535.

The second threshold may be included in the second section 520 or the third section 530. For example, when the second threshold is included in the second section 520, the user input processing apparatus may determine the recognition reliability to have a value equal to the second threshold, and may determine the delay time to have a value of "0" or substantially close to "0." When the second threshold is included in the third section 530, the user input processing apparatus may determine the recognition reliability to have a value equal to the second threshold, and may determine the delay time based on the sub-section 531.

The third threshold may be used to determine whether a function is to be performed. For example, when the recognition reliability is greater than the third threshold, the user input processing apparatus may determine whether the function is to be performed as a first value indicating positiveness. When the recognition reliability is less than the third threshold, the user input processing apparatus may determine whether the function is to be performed as a second value indicating negativeness. The third threshold may be included in the first value indicating positiveness or in the second value indicating negativeness.

Figure 6:
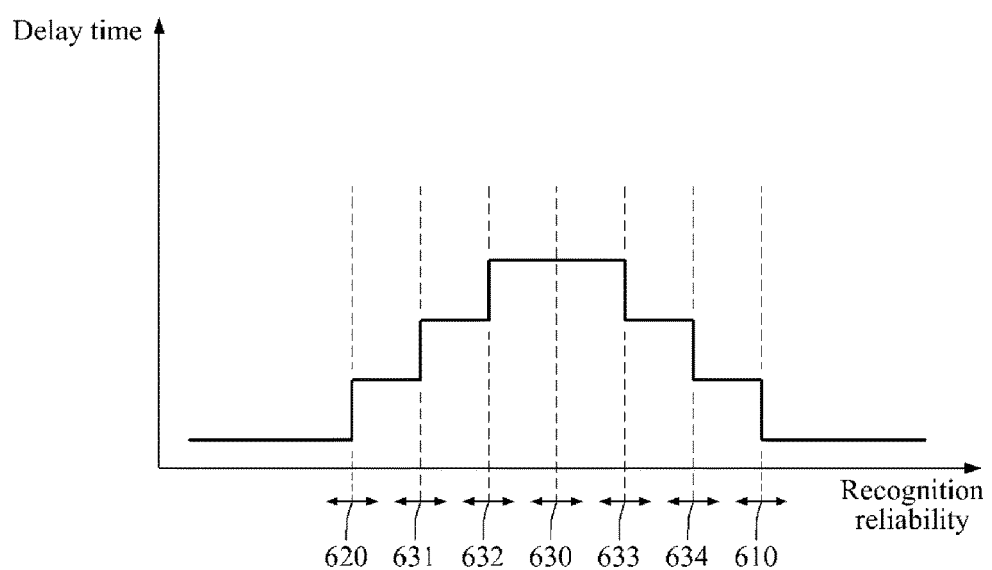
FIGS. 6 and 7 illustrate examples of updating a parameter according to an exemplary embodiment.
Figure 7:
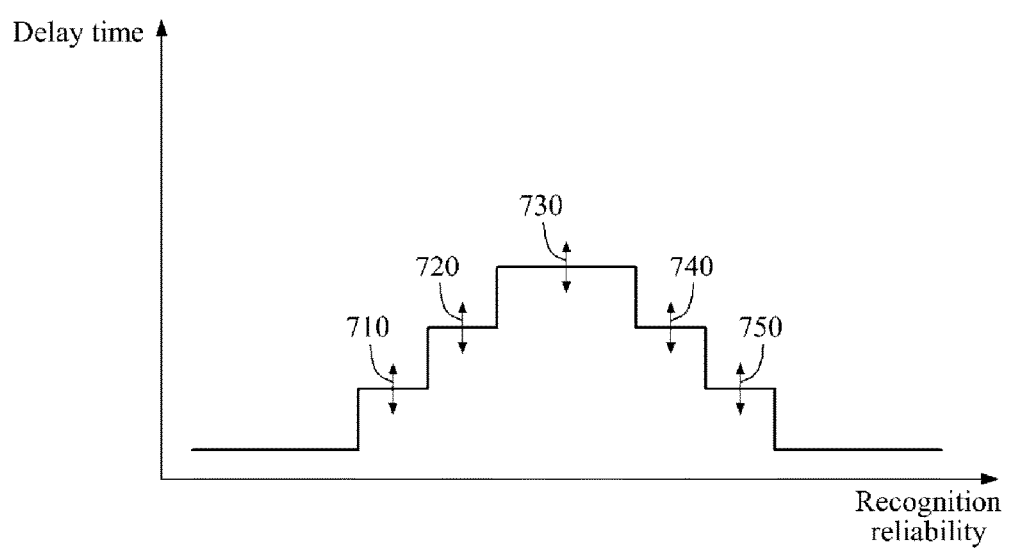

FIGS. 6 and 7 illustrate examples of updating a parameter according to an exemplary embodiment. Referring to FIG. 6, the parameter may include, for example, a first parameter used to determine a delay time, and/or a second parameter used to determine whether a function is to be performed. The first parameter may include a first threshold, a second threshold, a third threshold, and partition thresholds used to partition a section in which a recognition reliability is less than the first threshold and greater than the second threshold. The second parameter may include the third threshold or a fourth threshold.

The user input processing apparatus may adaptively update the first parameter and/or the second parameter. For example, the user input processing apparatus may adjust the first threshold, the second threshold, or the third threshold, as indicated by bidirectional arrows 610, 620, or 630, respectively, based on an additional input received from a user during a delay time. In addition, the user input processing apparatus may adjust at least one of the partition thresholds, as indicated by bidirectional arrows 631, 632, 633, and 634, based on the additional input. When the second parameter includes the fourth threshold, the user input processing apparatus may adjust the fourth threshold, based on the additional input, although not illustrated in the drawings.

Referring to FIG. 7, the first parameter may include a delay time of each of sub-sections included in a section in which a recognition reliability is less than the first threshold and greater than the second threshold. The user input processing apparatus may adaptively update the first parameter. For example, the user input processing apparatus may adjust a delay time of each of the sub-sections, as indicated by bidirectional arrows 710, 720, 730, 740, and 750, based on an additional input received from a user during a delay time.

Figure 8:
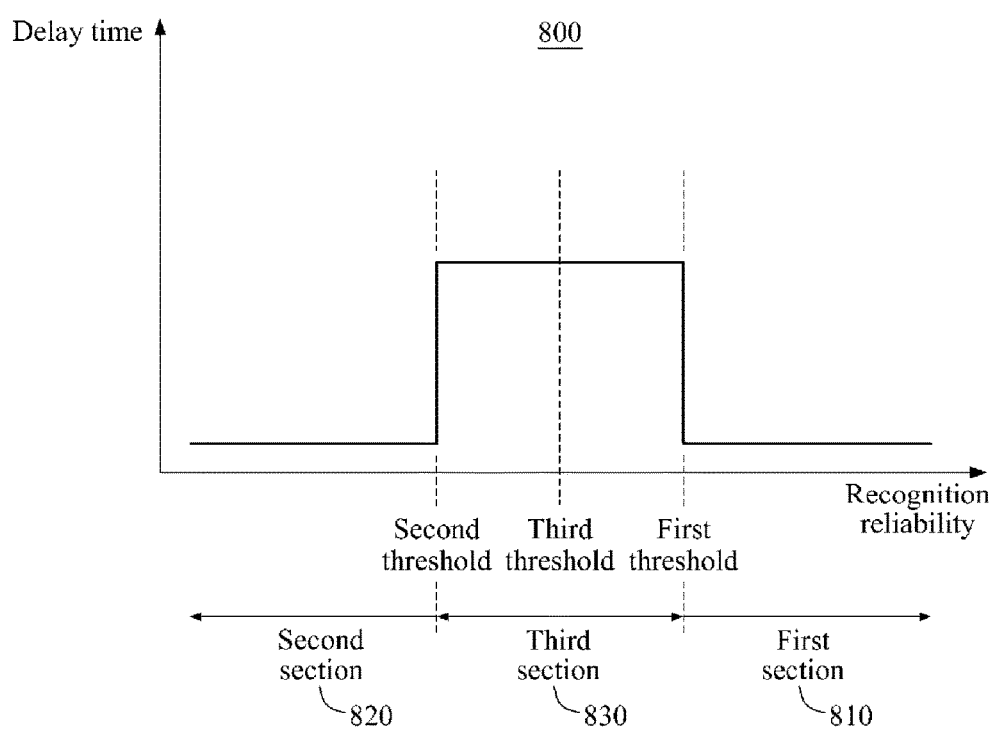
FIG. 8 is a graph illustrating still another example of an associative relationship between a recognition reliability and a delay time according to an exemplary embodiment.

FIG. 8 illustrates still another example of an associative relationship between a recognition reliability and a delay time according to an exemplary embodiment. Referring to FIG. 8, the associative relationship is represented by a graph 800. In the graph 800, an x-axis represents the recognition reliability, and a y-axis represents the delay time.

Referring to the graph 800, the delay time may be determined to have a low value in a first section 810 in which a value of the recognition reliability is greater than a first threshold. For example, in the first section 810, the delay time may be determined to have a value of "0" or a value substantially close to "0."

The delay time may also be determined to have a low value in a second section 820 indicating a low recognition reliability. In the second section 820, a value of the recognition reliability may be less than a second threshold, and the delay time may have a value of "0" or a value substantially close to "0." In a third section 830 indicating an intermediate level of the recognition reliability, the delay time may be determined to have a value. The value may be predetermined.

The first threshold may be included in the first section 810 or the third section 830. For example, when the first threshold is included in the first section 810, the user input processing apparatus may determine the recognition reliability to have a value equal to the first threshold, and may determine the delay time to have a value of "0" or substantially close to "0." When the first threshold is included in the third section 830, the user input processing apparatus may determine the recognition reliability to have a value equal to the first threshold, and may determine the delay time to have a value.

The second threshold may be included in the second section 820 or the third section 830. For example, when the second threshold is included in the second section 820, the user input processing apparatus may determine the recognition reliability to have a value equal to the second threshold, and may determine the delay time to have a value of "0" or substantially close to "0." When the second threshold is included in the third section 830, the user input processing apparatus may determine the recognition reliability to have a value equal to the second threshold, and may determine the delay time to have a value. The value may be predetermined.

The third threshold may be used to determine whether a function is to be performed. For example, when the recognition reliability is greater than the third threshold, the user input processing apparatus may determine whether the function is to be performed as a first value indicating positiveness. When the recognition reliability is less than the third threshold, the user input processing apparatus may determine whether the function is to be performed as a second value indicating negativeness. The third threshold may be included in the first value indicating positiveness or in the second value indicating negativeness.

Figure 9:
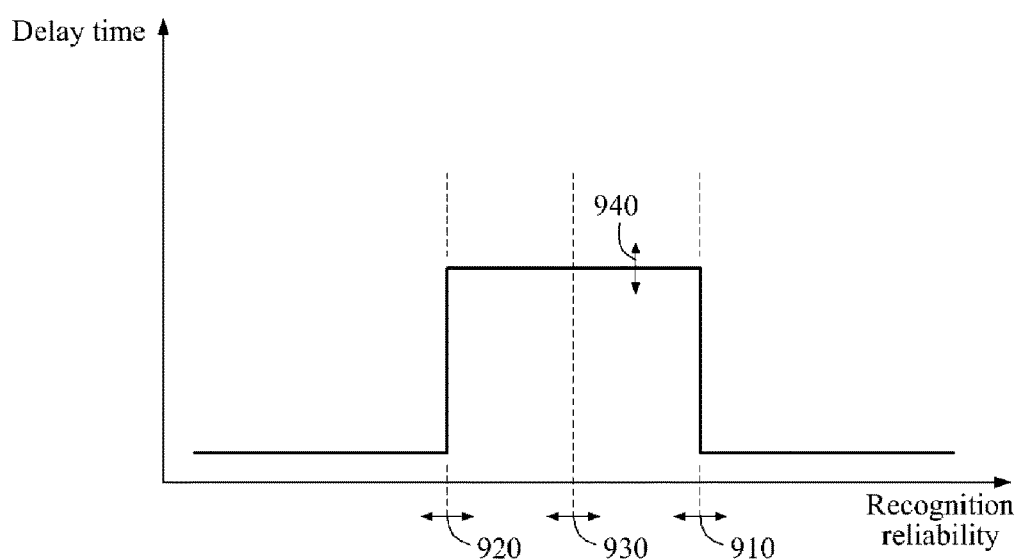
FIG. 9 illustrates another example of updating a parameter according to an exemplary embodiment.

FIG. 9 illustrate a further example of updating a parameter according to an exemplary embodiment. Referring to FIG. 9, the parameter may include, for example, a first parameter used to determine a delay time, and/or a second parameter used to determine whether a function is to be performed. The first parameter may include a first threshold and a second threshold, and the second parameter may include a third threshold.

The user input processing apparatus may adaptively update the first parameter and/or the second parameter. For example, the user input processing apparatus may adjust the first threshold, the second threshold, or the third threshold, as indicated by bidirectional arrows 910, 920, or 930, respectively, based on an additional input received from a user during a delay time.

Additionally, the first parameter may include a value for a section in which a recognition reliability is less than the first threshold and greater than the second threshold. The value may be predetermined. The user input processing apparatus may adjust the value as indicated by a bidirectional arrow 940, based on an additional input received from a user during a delay time.

Figure 10:
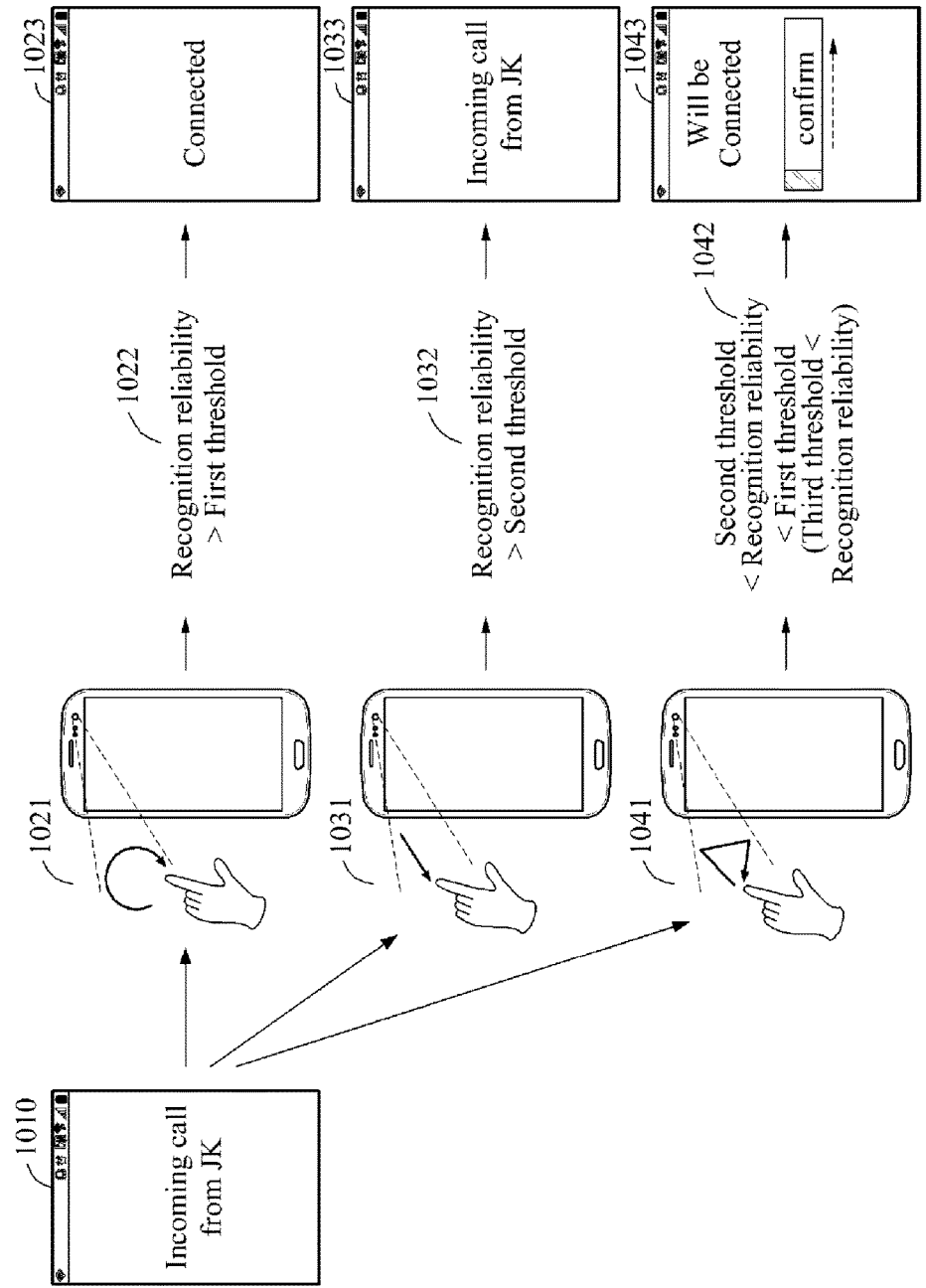
FIGS. 10 through 13 illustrate an example of an operation of a user input processing apparatus according to an exemplary embodiment.

FIGS. 10 through 13 illustrate an operation of a user input processing apparatus according to an exemplary embodiment. Referring to FIG. 10, the user input processing apparatus may detect an incoming call, and may display a screen 1010 notifying the incoming call on a display. The user input processing apparatus may detect a user input, and may calculate a recognition reliability of the user input for an incoming call connection function.

A user input corresponding to the incoming call connection function may be set in advance. For example, a motion of drawing a circle with a finger may be determined in advance for the incoming call connection function. In this example, the user input processing apparatus may calculate a degree to which the detected user input is matched to the motion, and may calculate a recognition reliability of the user input.

The user input processing apparatus may determine a delay time and whether the incoming call connection function is to be performed, based on the recognition reliability. For example, the user input processing apparatus may determine the delay time, and whether the incoming call connection function is to be performed, based on the graphs of FIGS. 2 through 9.

In an example, a recognition reliability 1022 of a first user input 1021 may be greater than the first threshold. The user input processing apparatus may determine a delay time to have a value set for a first section (for example, a value of "0"). Because the first threshold is greater than the third threshold, the recognition reliability 1022 may be greater than the third threshold. Therefore, in addition or alternatively, the user input processing apparatus may determine whether the incoming call connection function is to be performed as a first value indicating positiveness. In this example, the user input processing apparatus may connect the incoming call without the delay, and may display a screen 1023 to answer the incoming call on the display.

In another example, a recognition reliability 1032 of a second user input 1031 may be less than the second threshold. The user input processing apparatus may determine the delay time to have a value set for a second section (for example, a value of "0"). Because the second threshold is less than the third threshold, the recognition reliability 1032 may be less than the third threshold. Therefore, in addition or alternatively, the user input processing apparatus may determine whether the incoming call connection function is to be performed as a second value indicating negativeness. The user input processing apparatus may display a screen 1033 notifying the incoming call on the display, instead of processing the second user input 1031.

In still another example, a recognition reliability 1042 of a third user input 1041 may be less than the first threshold and greater than the second threshold. The user input processing apparatus may determine a delay time based on a distance between the recognition reliability 1042 and the third threshold. Additionally, the recognition reliability 1042 may be greater than the third threshold. The user input processing apparatus may determine whether the incoming call connection function is to be performed as the first value.

In this example, during the delay time, the user input processing apparatus may feed back to a user information indicating that the incoming call connection function is determined as a target function and that whether the incoming call connection function is to be performed is determined as the first value. Additionally, the user input processing apparatus may feed back a remaining delay time to the user. For example, the user input processing apparatus may display a feedback screen 1043 on the display. In the feedback screen 1043, a text "Will be connected" may indicate that the incoming call connection function is determined as a target function, and a "confirm" icon may indicate that whether the incoming call connection function is to be performed is determined as the first value. Additionally, a progress bar on the "confirm" icon may indicate the remaining delay time.

Figure 11:
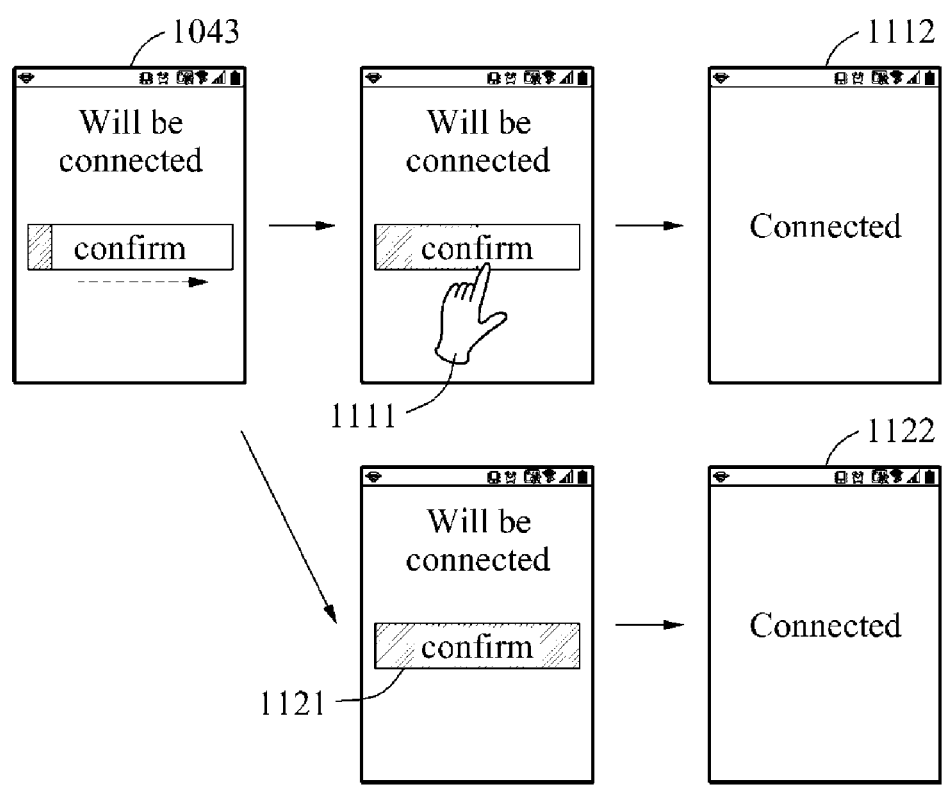

Referring to FIG. 11, the user input processing apparatus may operate based on whether an additional input is received during the delay time. In an example, the user input processing apparatus may detect an additional input 1111 received by clicking on a "confirm" icon during the delay time. In this example, the user input processing apparatus may connect the incoming call, instead of waiting until the delay time elapses, and may display a screen 1112 to answer the incoming call on the display. For convenience of description, the additional input 1111 may be received by clicking on the "confirm" icon, however, there is no limitation thereto. Accordingly, exemplary embodiments may equally be applied to an additional input received, for example, by a motion, a gesture, or a voice.

In another example, the user input processing apparatus may determine that an additional input has not been received prior to the delay time elapsing. In this example, a progress bar on a "confirm" icon 1121 may indicate 100% and accordingly, the user input processing apparatus may notify the user that the delay time has elapsed. In addition, the user input processing apparatus may control the incoming call connection function, based on whether the incoming call connection function is to be performed. Because whether the incoming call connection function is to be performed is assumed as the first value, the user input processing apparatus may automatically connect the incoming call after the delay time elapses, and may display a screen 1122 to answer the incoming call on the display.

Figure 12:
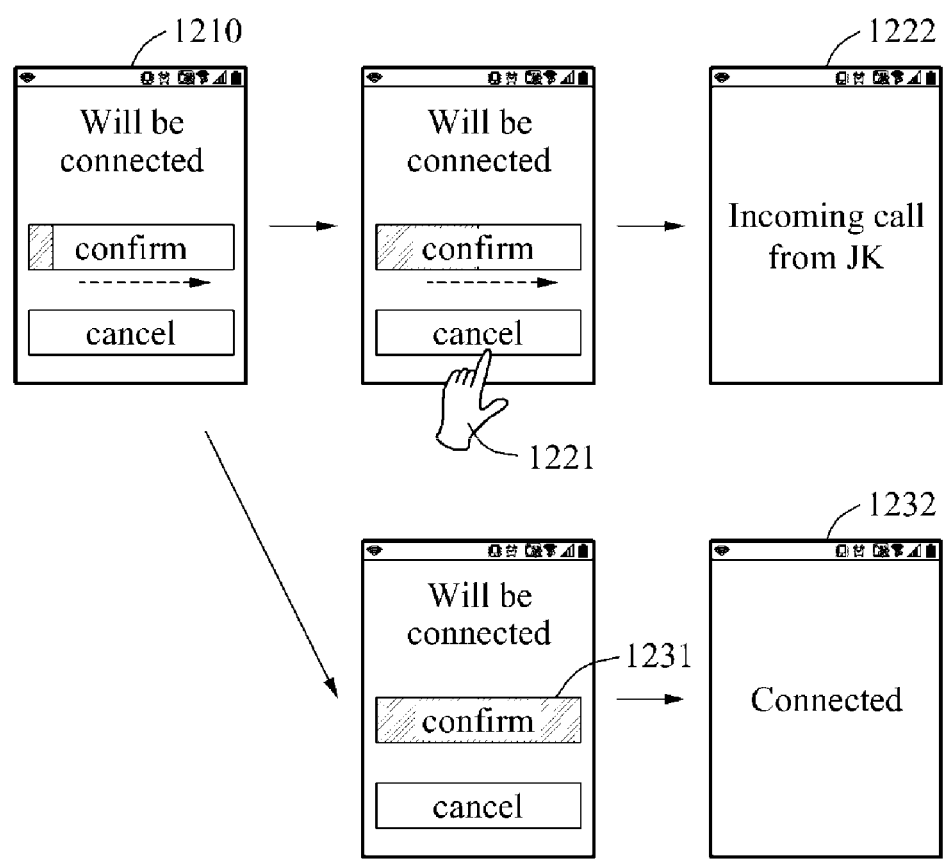

Referring to FIG. 12, the user input processing apparatus may provide the user with an interface used to confirm a determination result obtained by the user input processing apparatus determining whether a function is to be performed, as well as an interface to change the determination result. For example, a feedback screen 1210 may include a "confirm" icon and a "cancel" icon. In the feedback screen 1210, the "confirm" icon may correspond to the interface used to confirm the determination result, and the "cancel" icon may correspond to the interface used to change the determination result.

The user input processing apparatus may operate based on whether an additional input is received during the delay time. In an example, the user input processing apparatus may detect an additional input 1221 received by clicking on the "cancel" icon during the delay time. In this example, the user input processing apparatus may display a screen 1222 notifying the incoming call on the display, instead of processing the third user input 1041 of FIG. 10.

In another example, the user input processing apparatus may determine that an additional input is has not been received prior to the delay time elapsing. In this example, a progress bar on a "confirm" icon 1231 may indicate 100% and accordingly, the user input processing apparatus may notify the user that the delay time has elapsed. In addition, the user input processing apparatus may control the incoming call connection function, based on whether the incoming call connection function is to be performed. Because whether the incoming call connection function is to be performed is assumed as the first value, the user input processing apparatus may automatically connect the incoming call after the delay time elapses, and may display a screen 1232 to answer the incoming call on the display.

Figure 13:
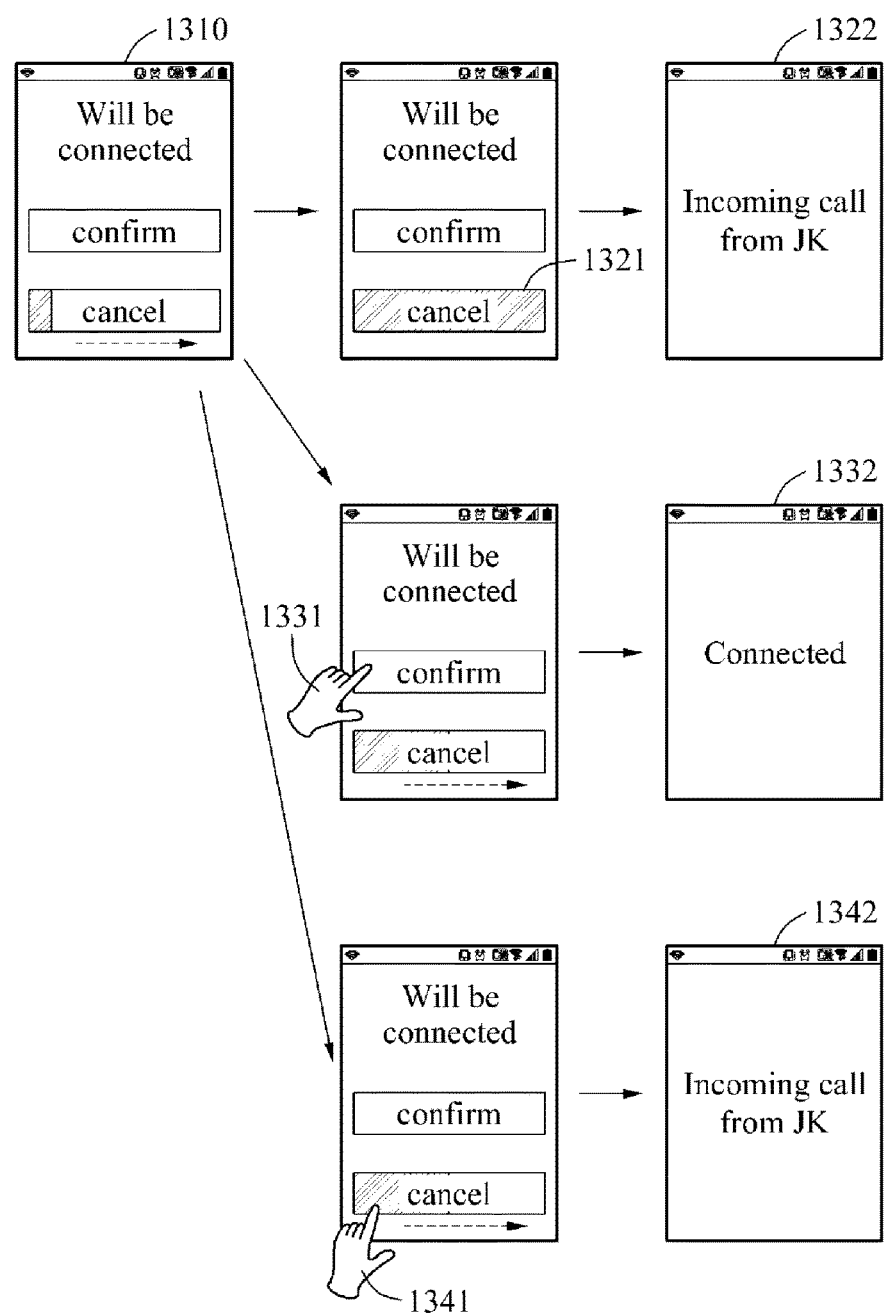

FIG. 13 illustrates an operation of the user input processing apparatus to be performed when the recognition reliability 1042 of FIG. 10 is less than the third threshold. The user input processing apparatus may determine whether the incoming call connection function is to be performed as the second value, based on the recognition reliability 1042 determined to be less than the third threshold.

Referring to FIG. 13, during the delay time, the user input processing apparatus may feed back to the user information indicating that the incoming call connection function is determined as a target function and that whether the incoming call connection function is to be performed is determined as the second value. Additionally, the user input processing apparatus may feed back a remaining delay time to the user. For example, the user input processing apparatus may display a feedback screen 1310 on the display. In the feedback screen 1310, a text "Will be connected" may indicate that the incoming call connection function is determined as a target function, and a "cancel" icon may indicate that whether the incoming call connection function is to be performed is determined as the second value. Additionally, a progress bar on the "cancel" icon may indicate the remaining delay time.

As described above, when whether a function is to be performed is determined as the first value, the user input processing apparatus may display a progress bar on a "confirm" icon. When whether the function is to be performed is determined as the second value, the user input processing apparatus may display a progress bar on a "cancel" icon. However, the indication method is not limited to this, and highlighting or offsetting or other methods may be used.

The user input processing apparatus may operate based on whether an additional input is received during the delay time. In an example, the user input processing apparatus may determine that an additional input has not been received prior to the delay time elapsing. In this example, a progress bar on a "cancel" icon 1321 may indicate 100% and accordingly, the user input processing apparatus may notify the user that the delay time has elapsed. In addition, the user input processing apparatus may control the incoming call connection function, based on whether the incoming call connection function is to be performed. Because whether the incoming call connection function is to be performed is assumed as the second value, the user input processing apparatus may display a screen 1322 notifying the incoming call on the display, instead of processing a user input after the delay time has elapsed.

In another example, the user input processing apparatus may detect an additional input 1331 received by clicking on a "confirm" icon during the delay time. In this example, the user input processing apparatus may connect the incoming call, instead of waiting until the delay time elapses, and may display a screen 1332 to answer the incoming call on the display.

In still another example, the user input processing apparatus may detect an additional input 1341 received by clicking on the "cancel" icon during the delay time. In this example, the user input processing apparatus may display a screen 1342 notifying the incoming call on the display, instead of processing a user input.

Figure 14:
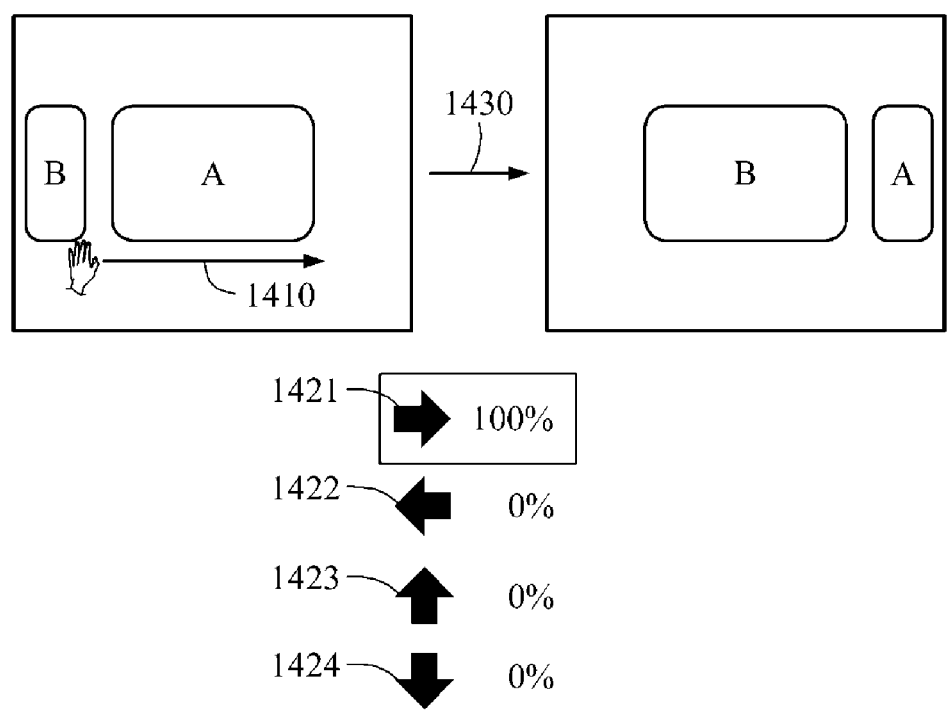
FIGS. 14 through 19 illustrate another example of an operation of a user input processing apparatus according to an exemplary embodiment.

Hereinafter, an operation of a user input processing apparatus to be performed when a plurality of functions are determined in advance will be described. FIGS. 14 through 19 illustrate an operation of a user input processing apparatus according to an exemplary embodiment. Referring to FIG. 14, the user input processing apparatus may acquire recognition reliabilities of a user input, based on a plurality of functions.

In an example, the user input processing apparatus may apply a user input to a classifier that is provided in advance. The classifier may classify the user input as one of a plurality of functions. The classifier may calculate each of recognition reliabilities corresponding to the functions. The user input processing apparatus may acquire a plurality of recognition reliabilities output from the classifier.

In another example, the user input processing apparatus may apply a user input to each of a plurality of models corresponding to a plurality of functions. The models may correspond to different functions, and may output different recognition reliabilities based on the same user input. The user input processing apparatus may acquire a plurality of recognition reliabilities output from the models. Referring to FIG. 14, the user input processing apparatus may detect a motion 1410 of a user's hand. A plurality of functions may include, for example, a function 1421 of turning a page to the right, a function 1422 of turning a page to the left, a function 1423 of moving to an upper level, and a function 1424 of moving to a lower level.

The user input processing apparatus may acquire recognition reliabilities of the motion 1410, corresponding to the functions. For example, a recognition reliability corresponding to the function 1421 may be 100%, and recognition reliabilities corresponding to the other functions 1422, 1423, and 1424 may be 0%.

The user input processing apparatus may determine, based on the recognition reliabilities, delay times corresponding to the functions, and whether the functions are to be performed. The user input processing apparatus may determine a delay time corresponding to each of the functions and whether each of the functions is to be performed, based on the above description of FIGS. 1 through 9.

For example, a recognition reliability of 100% may be greater than the first threshold, and a recognition reliability of 0% may be less than the second threshold. Additionally, the recognition reliability of 100% may be greater than the third threshold, and the recognition reliability of 0% may be less than the third threshold.

Based on the recognition reliability corresponding to the function 1421 determined to be greater than the first threshold, the user input processing apparatus may determine a delay time of the function 1421 as "0," and may determine whether the function 1421 is to be performed as a first value indicating positiveness. Additionally, based on each of the recognition reliabilities corresponding to the other functions 1422, 1423, and 1424 determined to be less than the second threshold, the user input processing apparatus may determine a delay time of each of the other functions 1422, 1423, and 1424 as "0," and may determine whether each of the other functions 1422, 1423, and 1424 is to be performed as a second value indicating negativeness.

The user input processing apparatus may control the functions, based on the delay times and whether the functions are to be performed. For example, the user input processing apparatus may detect a recognition reliability greater than the first threshold, among the acquired recognition reliabilities. When the first threshold is assumed to be 70%, the recognition reliability of 100% may be detected that is greater than the first threshold. In operation 1430, the user input processing apparatus may perform the function 1421 after the delay time of the function 1421.

Figure 15:
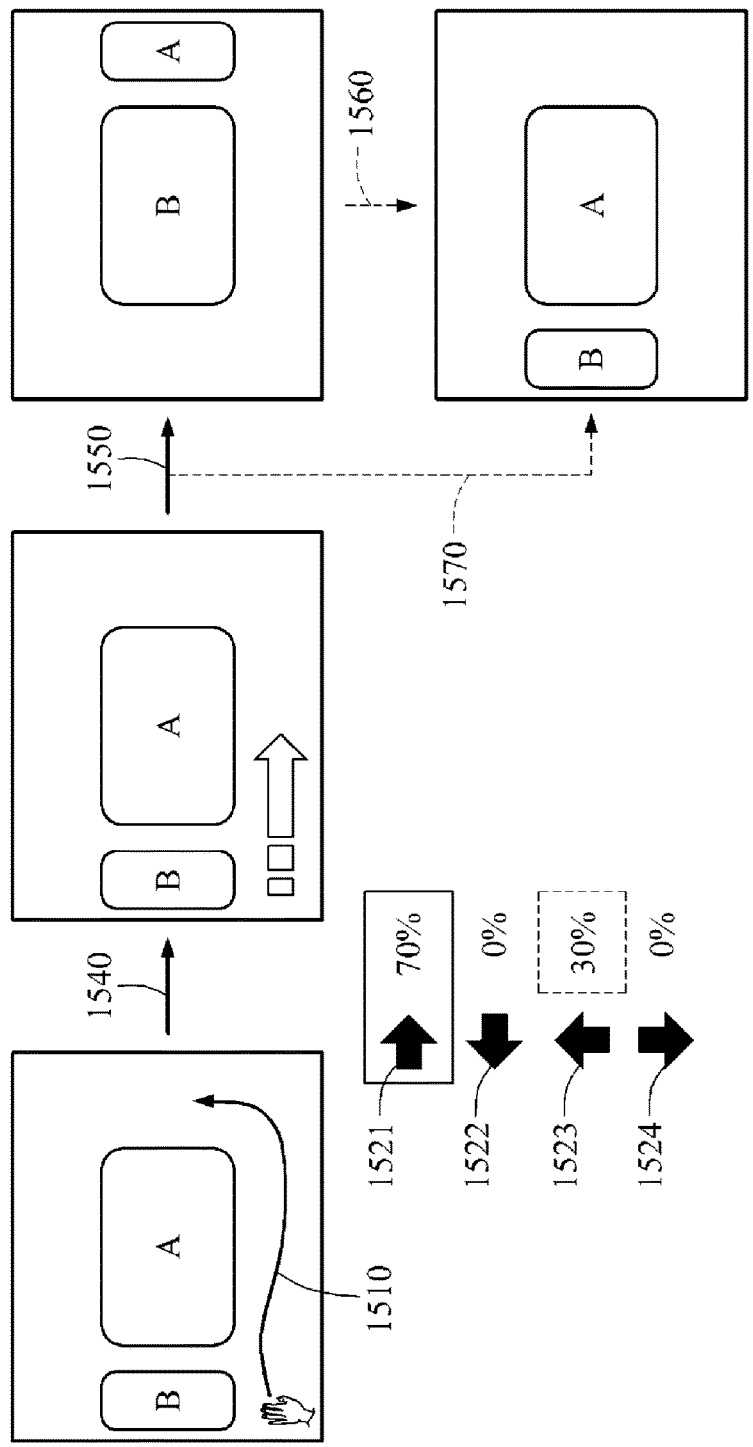

Referring to FIG. 15, when a motion 1510 of a user's hand is detected, a recognition reliability corresponding to a function 1521 of turning a page to the right may be 70%, a recognition reliability corresponding to a function 1523 of moving to an upper level may be 30%, and recognition reliabilities corresponding to the other functions 1522 and 1524 may be 0%.

The user input processing apparatus may determine, based on a plurality of recognition reliabilities, delay times corresponding to a plurality of functions, and whether the functions are to be performed. For example, the recognition reliability of 70% and the recognition reliability of 30% may each be less than the first threshold and greater than the second threshold. Additionally, the recognition reliability of 0% may be less than the second threshold. The recognition reliability of 70% may be greater than the third threshold, and the recognition reliability of 30% and the recognition reliability of 0% may be less than the third threshold.

Based on the recognition reliability corresponding to the function 1521 determined to be less than the first threshold and greater than the second threshold, the user input processing apparatus may determine a delay time of the function 1521 based on a distance with the third threshold, and may determine whether the function 1521 is to be performed as the first value. Based on the recognition reliability corresponding to the function 1523 determined to be less than the first threshold and greater than the second threshold, the user input processing apparatus may determine a delay time of the function 1523 based on a distance with the third threshold, and may determine whether the function 1523 is to be performed as the second value. Additionally, based on the recognition reliabilities corresponding to the other functions 1522 and 1524 determined to be less than the second threshold, the user input processing apparatus may determine delay times of the other functions 1522 and 1524 as "0," and may determine whether the other functions 1522 and 1524 are to be performed as the second value.

The user input processing apparatus may control the functions, based on the delay times and whether the functions are to be performed. For example, the user input processing apparatus may detect recognition reliabilities that are less than the first threshold and greater than the second threshold, among the acquired recognition reliabilities. Accordingly, the recognition reliability of 70% and the recognition reliability of 30% may be detected.

The user input processing apparatus may select the function 1521 corresponding to the first value. In operation 1540, the user input processing apparatus may control the function 1521, based on the delay time of the function 1521. For example, the user input processing apparatus may control a performance speed of the function 1521 during the delay time. In this example, the user input processing apparatus may control a page to be slowly turned to the right during the delay time and accordingly, may indirectly notify a user that the recognition reliability is not sufficiently high. The user input processing apparatus may feed back a recognition result to the user during the delay time. The user input processing apparatus may not perform the function 1521 until the delay time elapses, and perform the function 1521 after the delay time elapses.

When an additional input corresponding to a confirm command is received from the user during the delay time, the user input processing apparatus may complete the function 1521, instead of waiting until the delay time has elapsed. When an additional input corresponding to a cancel command is not received from the user during the delay time, the user input processing apparatus may complete the function 1521 in operation 1550.

When the additional input corresponding to the cancel command is received from the user during the delay time, the user input processing apparatus may cancel the function 1521. When the additional input corresponding to the cancel command is received within a waiting time after the function 1521 is completed, the user input processing apparatus may return to a state before the function 1521 is performed in operation 1560. When the additional input corresponding to the cancel command is received before the function 1521 is completed, the user input processing apparatus may not perform the function 1521 in operation 1570.

Figure 16:
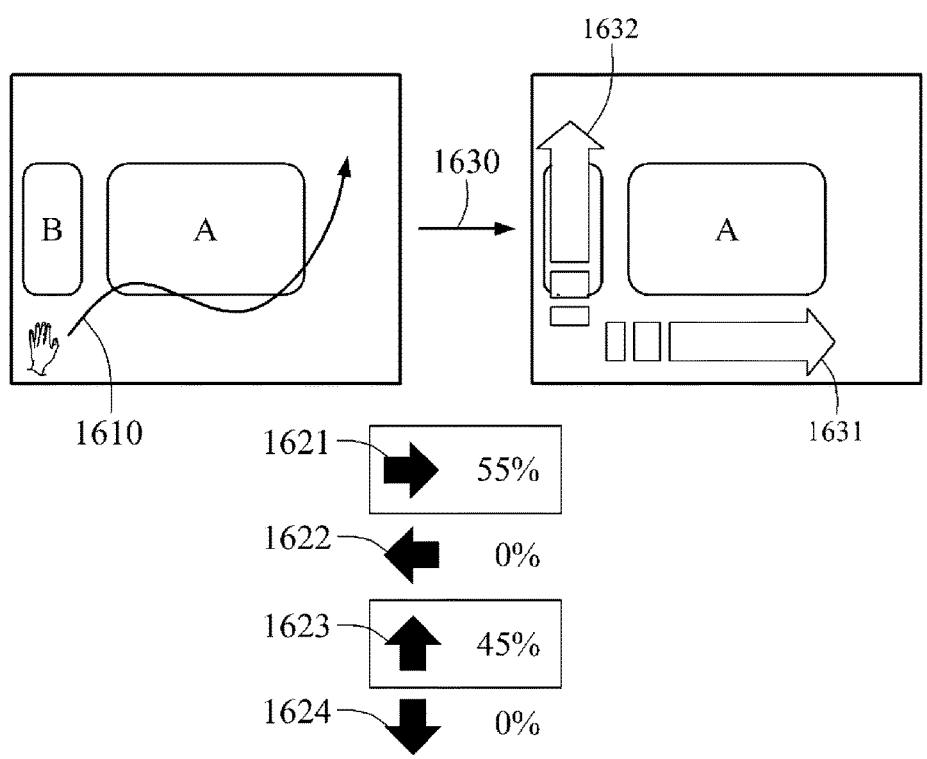

Referring to FIG. 16, when a motion 1610 of a user's hand is detected, a recognition reliability corresponding to a function 1621 of turning a page to the right may be 55%, a recognition reliability corresponding to a function 1623 of moving to an upper level may be 45%, and recognition reliabilities corresponding to the other functions 1622 and 1624 may be 0%.

The user input processing apparatus may determine delay times corresponding to a plurality of functions, and whether the functions are to be performed, based on a plurality of recognition reliabilities. For example, the recognition reliability of 55% and the recognition reliability of 45% may be less than the first threshold and greater than the second threshold. The recognition reliability of 0% may be less than the second threshold. Additionally, the recognition reliability of 55% may be greater than the third threshold, the recognition reliability of 45% and the recognition reliability of 0% may be less than the third threshold.

Based on the recognition reliability corresponding to the function 1621 determined to be less than the first threshold and greater than the second threshold, the user input processing apparatus may determine a delay time of the function 1621 based on a distance with the third threshold, and may determine whether the function 1621 is to be performed as the first value. Based on the recognition reliability corresponding to the function 1623 determined to be less than the first threshold and greater than the second threshold, the user input processing apparatus may determine a delay time of the function 1623 based on a distance with the third threshold, and may determine whether the function 1623 is to be performed as the second value. Additionally, based on the recognition reliabilities corresponding to the other functions 1622 and 1624 determined to be less than the second threshold, the user input processing apparatus may determine delay times of the other functions 1622 and 1624 as "0," and may determine whether the other functions 1622 and 1624 are to be performed as the second value.

The user input processing apparatus may control the functions, based on the delay times and whether the functions are to be performed. For example, the user input processing apparatus may detect recognition reliabilities that are less than the first threshold and greater than the second threshold, among the acquired recognition reliabilities. Accordingly, the recognition reliability of 55% and the recognition reliability of 45% may be detected.

When the detected recognition reliabilities are similar to each other within a range, the user input processing apparatus may provide a user with an interface used to select one of the detected recognition reliabilities in operation 1630. The range may be predetermined. For example, the user input processing apparatus may provide the user with a first interface 1631 used to select the function 1621, and a second interface 1632 used to select the function 1623.

When an additional input is not received from the user during a period of time, the user input processing apparatus may not perform a function. The period of time may be predetermined. The period of time may be determined based on the delay time of the function 1621 and the delay time of the function 1623, or may be set in advance.

When an additional input is received from the user during the period of time, the user input processing apparatus may perform a function selected by the user. For example, when the first interface 1631 is selected, the user input processing apparatus may perform the function 1621. The first interface 1631 may be selected by various schemes. For example, the first interface 1631 may be provided to the user in the form of a clickable icon. In this example, the first interface 1631 may be selected by a user's click. In another example, the first interface 1631 may be provided to the user in the form of an indicator to induce a motion of the user. That is, the first interface 1631 may be provided to the user in the form of an indicator that prompts the user to perform a motion. In this example, the first interface 1631 may be selected by the induced motion. When the second interface 1632 is selected, the user input processing apparatus may perform the function 1623. The second interface 1632 may also be selected by various schemes, similarly to the first interface 1631.

Figure 17:
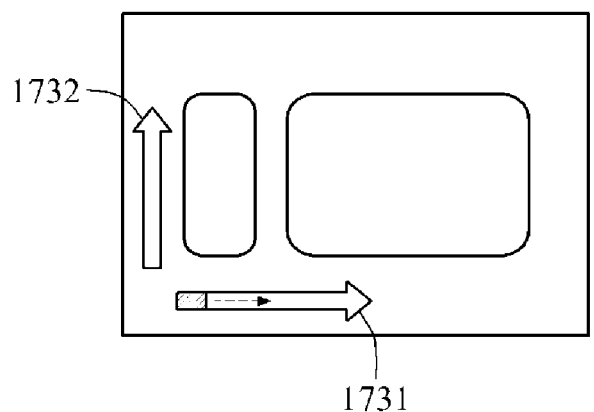

Referring to FIG. 17, a recognition reliability corresponding to a function 1721 of turning a page to the right may be 55%, and a recognition reliability corresponding to a function 1723 of moving to an upper level may be 45%. A first delay time of the function 1721, and a second delay time of the function 1723 may be set to 3 seconds (sec).

The user input processing apparatus may determine a representative delay time, based on the first delay time and the second delay time. In an example, the user input processing apparatus may determine, as a representative delay time, either a minimum value or a maximum value among the first delay time and the second delay time. In another example, the user input processing apparatus may determine, as a representative delay time, an average value of the first delay time and the second delay time. In still another example, when at least three delay times are used, the user input processing apparatus may determine, as a representative delay time, an intermediate value among the at least three delay times.

In yet another example, the user input processing apparatus may determine one of a plurality of delay times as a representative delay time. The user input processing apparatus may determine, as a representative delay time, a delay time of a function with a greatest recognition reliability among the delay times.

The user input processing apparatus may control the functions 1721 and 1723 corresponding to the detected recognition reliabilities, based on the representative delay time, whether the function 1721 is to be performed, and whether the function 1723 is to be performed.

During the representative delay time, the user input processing apparatus may provide a user with an interface used to select one of functions corresponding to the detected recognition reliabilities. For example, the user input processing apparatus may provide the user with a first interface 1731 used to select the function 1721, and a second interface 1732 used to select the function 1723.

The user input processing apparatus may feed back to the user a remaining delay time and whether the functions corresponding to the detected recognition reliabilities are to be performed. For example, to feedback to the user that whether the function 1721 is to be performed is determined as the first value, the user input processing apparatus may display a progress bar on the first interface 1731. The progress bar may be used to feed back the remaining delay time to the user.

The user input processing apparatus may receive an additional input to select either the first interface 1731 or the second interface 1732. The user input processing apparatus may perform a function corresponding to the selected interface. When an additional input is not received before the representative delay time has elapsed, the user input processing apparatus may perform the function 1721 corresponding to the first value.

Figure 18:
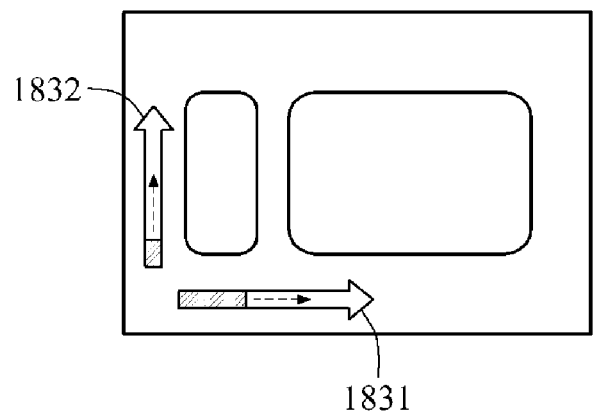

Referring to FIG. 18, a recognition reliability corresponding to a function 1821 of turning a page to the right may be 60%, and a recognition reliability corresponding to a function 1823 of moving to an upper level may be 51%. A first delay time of the function 1821 may be set to 2 sec, and a second delay time of the function 1823 may be set to 5 sec.

The user input processing apparatus may determine a representative delay time, based on the first delay time and the second delay time. The user input processing apparatus may control the functions 1821 and 1823 corresponding to the detected recognition reliabilities, based on the representative delay time, whether the function 1821 is to be performed, and whether the function 1823 is to be performed.

During the representative delay time, the user input processing apparatus may provide a user with an interface used to select one of functions corresponding to the detected recognition reliabilities. For example, the user input processing apparatus may provide the user with a first interface 1831 used to select the function 1821, and a second interface 1832 used to select the function 1823.

The user input processing apparatus may feed back to the user a remaining delay time and whether the functions corresponding to the detected recognition reliabilities are to be performed. For example, to feedback to the user that whether the function 1821 is to be performed is determined as the first value, the user input processing apparatus may display a progress bar on the first interface 1831. The progress bar on the first interface 1831 may be used to feed back to the user a remaining delay time in the representative delay time. Additionally, to feedback the user that whether the function 1823 is to be performed is determined as the first value, the user input processing apparatus may display a progress bar on the second interface 1832.

The progress bar on the first interface 1831 may be used to feed back to the user a remaining delay time in the first delay time. The progress bar on the second interface 1832 may be used to feed back to the user a remaining delay time in the second delay time. Because the first delay time is shorter than the second delay time, an animation speed of the progress bar on the first interface 1831 may be higher than an animation speed of the progress bar on the first interface 1832.

The user input processing apparatus may receive an additional input to select either the first interface 1831 or the second interface 1832. The user input processing apparatus may perform a function corresponding to the selected interface. When an additional input is not received prior to the end of the representative delay time, the user input processing apparatus may perform a function with a greatest recognition reliability, for example the function 1821, among functions corresponding to the first value representing whether the functions are to be performed.

Figure 19:
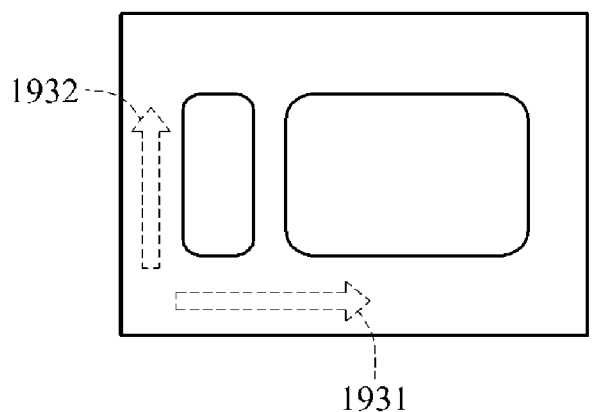

Referring to FIG. 19, a recognition reliability of a function 1921 of turning a page to the right, and a recognition reliability of a function 1923 of moving to an upper level may be 40%. A first delay time of the function 1921, and a second delay time of the function 1923 may be set to 2 sec.

The user input processing apparatus may determine a representative delay time, based on the first delay time and the second delay time. The user input processing apparatus may control the functions 1921 and 1923 corresponding to the detected recognition reliabilities, based on the representative delay time, whether the function 1921 is to be performed, and whether the function 1923 is to be performed.

During the representative delay time, the user input processing apparatus may provide a user with an interface used to select one of functions corresponding to the detected recognition reliabilities. For example, the user input processing apparatus may provide the user with a first interface 1931 used to select the function 1921, and a second interface 1932 used to select the function 1923.

The user input processing apparatus may feed back to the user a remaining delay time and whether the functions corresponding to the detected recognition reliabilities are to be performed. For example, to feedback to the user that whether the function 1921 is to be performed is determined as the second value, the user input processing apparatus may display the first interface 1931 to be gradually faded. A degree to which the first interface 1931 is faded may indicate a remaining delay time in the representative delay time and accordingly, may be used to notify the user of the remaining delay time. Additionally, to feedback to the user that whether the function 1923 is to be performed is determined as the second value, the user input processing apparatus may display the second interface 1932 to be gradually faded. A degree to which the second interface 1932 is faded may indicate a remaining delay time in the representative delay time and accordingly, may be used to notify the user of the remaining delay time.

The user input processing apparatus may receive an additional input to select either the first interface 1931 or the second interface 1932. The user input processing apparatus may perform a function corresponding to the selected interface. When an additional input is not received prior to the end of the representative delay time, the user input processing apparatus may not process a user input, because a function corresponding to the first value representing whether the function is to be performed does not exist.

In addition to the above description, it is noted that it would be possible to have a type of three-dimensional recognition/selection in which three functions are indicated, for example in the case when a gesture may be made by a finger in space. For example, the movement of the finger may indicate a swipe left in space (x-axis), a swipe up in space (yaxis), and also a swipe toward the device (z-axis), where the swipe toward the device may indicate closing the window or image pane, etc.

Figure 20:
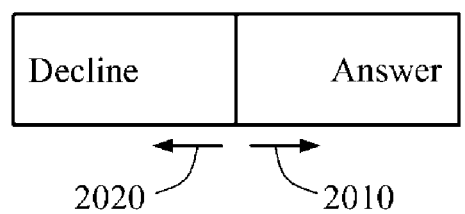
FIGS. 20 and 21 illustrate examples of a user feedback method according to an exemplary embodiment.
Figure 21:
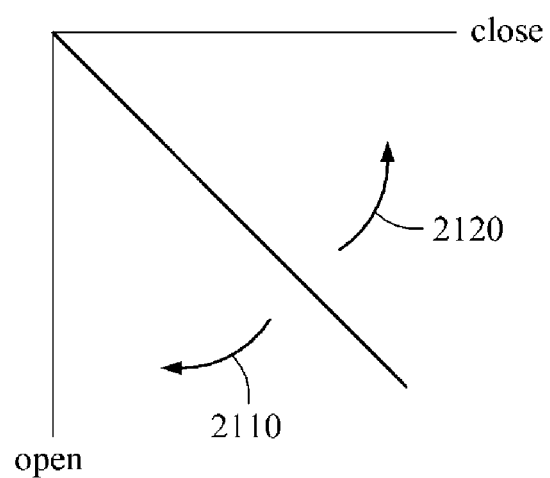

FIGS. 20 and 21 illustrate a user feedback method according to an exemplary embodiment. A user input processing apparatus according to an exemplary embodiment may intuitively feed back a plurality of functions that are associated with each other. Referring to FIG. 20, the user input processing apparatus may use a bidirectional progress bar showing a gauge that may bidirectionally move. To notify that whether to answer an incoming call is determined as the first value, the user input processing apparatus may move the gauge to the right in operation 2010. To notify that whether to decline an incoming call is determined as the first value, the user input processing apparatus may move the gauge to the left in operation 2020. Additionally, the user input processing apparatus may move the gauge based on an amount of a remaining delay time and accordingly, the remaining delay time may be fed back to the user.

Referring to FIG. 21, the user input processing apparatus may provide mechanical feedback to the user. For example, the user input processing apparatus may control a mechanical movement of a doorknob, using a motor, and the like. To notify that whether to open a door is determined as the first value, the user input processing apparatus may move the doorknob clockwise in operation 2110. To notify that whether to close a door is determined as the first value, the user input processing apparatus may move the doorknob counterclockwise in operation 2120. Additionally, the user input processing apparatus may move the doorknob based on an amount of a remaining delay time and accordingly, the remaining delay time may be fed back to the user.

Figure 22:
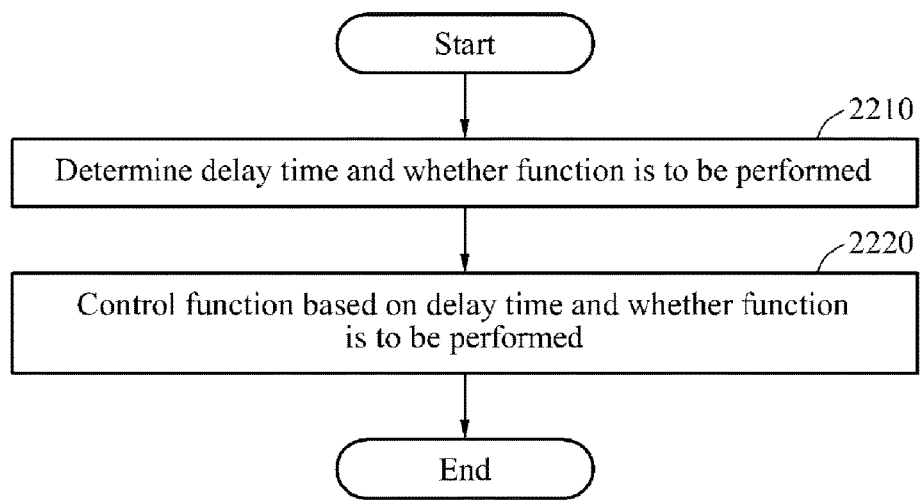
FIG. 22 is a flowchart illustrating an example of a user input processing method according to an exemplary embodiment.

FIG. 22 is a flowchart illustrating an example of a user input processing method according to an exemplary embodiment. Referring to FIG. 22, in operation 2210, the user input processing method determines a delay time and whether a function determined in advance is to be performed, based on a recognition reliability of a user input for the function. In operation 2220, the user input processing method controls the function based on the delay time and whether the function is to be performed.

Figure 23:
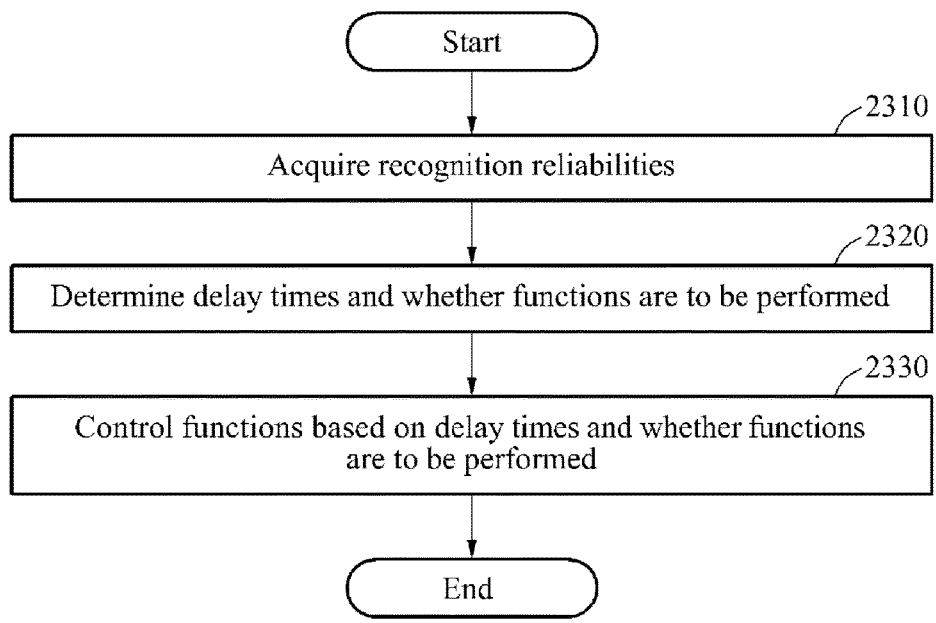
FIG. 23 is a flowchart illustrating another example of a user input processing method according to an exemplary embodiment.

FIG. 23 is a flowchart illustrating another example of a user input processing method according to an exemplary embodiment. Referring to FIG. 23, in operation 2310, the user input processing method acquires recognition reliabilities of a user input, corresponding to a plurality of functions. In operation 2320, the user input processing method determines delay times corresponding to the functions and whether the functions are to be performed, based on the recognition reliabilities. In operation 2330, the user input processing method controls the functions based on the delay times and whether the functions are to be performed.

The above description provided with reference to FIGS. 1 through 21 may be directly applicable to operations 2210 and 2220 of FIG. 22 and operations 2310 through 2330 of FIG. 23 and accordingly, will not be repeated here.

Figure 24:
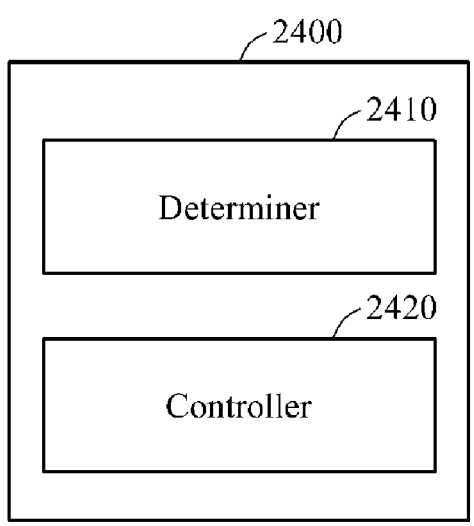
FIG. 24 is a block diagram illustrating an example of a user input processing apparatus according to an exemplary embodiment.

FIG. 24 is a block diagram illustrating a user input processing apparatus 2400 according to an exemplary embodiment. Referring to FIG. 24, the user input processing apparatus 2400 includes a determiner 2410, and a controller 2420. The determiner 2410 may determine a delay time and whether a function determined in advance is to be performed, based on a recognition reliability of a user input for the function. The controller 2420 may control the function based on whether the function is to be performed, after the delay time.

Figure 25:
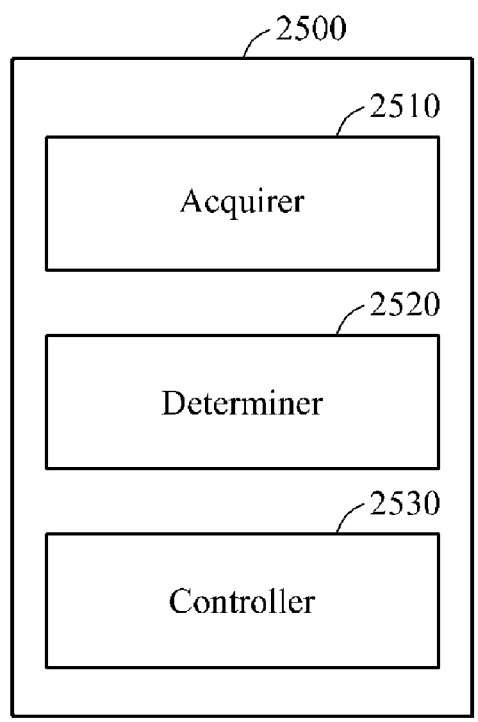
FIG. 25 is a block diagram illustrating another example of a user input processing apparatus according to an exemplary embodiment.

FIG. 25 is a block diagram illustrating a user input processing apparatus 2500 according to an exemplary embodiment. Referring to FIG. 25, the user input processing apparatus 2500 includes an acquirer 2510, a determiner 2520, and a controller 2530. The acquirer 25210 may acquire recognition reliabilities of a user input, corresponding to a plurality of functions. The determiner 2520 may determine delay times corresponding to the functions, and whether the functions are to be performed, based on the recognition reliabilities. The controller 2530 may control the functions, based on the delay times and whether the functions are to be performed.

The above description provided with reference to FIGS. 1 through 21 may be directly applicable to each of modules of FIGS. 24 and 25 and accordingly, will not be repeated here.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present inventive concept is not limited thereto. Instead, it will be appreciated by those skilled in the art that changes may be made to these exemplary embodiments without departing from the principles and spirit of the disclosure, the scope of which is defined by the claims and their equivalents.

What is claimed is:

1. A user input processing method comprising:
   determining, based on a recognition reliability of a user input for a function, a delay time which is a time interval before initiating the function and whether the function is to be performed, the function being determined in advance;
   providing a user with an interface to confirm whether the function is to be performed, wherein the interface indicates the user performing an additional input related with an initiation of the function, during the delay time; and
   controlling the function based on whether the delay time is elapsed and whether the function is to be performed,
   wherein the determining whether the function is to be performed comprises determining whether the function is to be performed as a first value indicating positiveness or as a second value indicating negativeness by comparing the recognition reliability with a predetermined threshold,
   wherein the controlling the function further comprises:
   when the additional input associated with the interface is received from the user during the delay time, adjusting the predetermined threshold, and
   determining, if the delay time is elapsed without the additional input, whether to perform the function based on whether the function is to be performed being determined as the first value or the second value,
   wherein the interface provides the user a visualization of the delay time.

2. The user input processing method of claim 1, wherein the recognition reliability indicates a degree to which a result obtained by recognizing the user input is matched to a pattern corresponding to the function.

3. The user input processing method of claim 1, wherein the determining the delay time comprises, in response to the recognition reliability being greater than a threshold, determining the delay time to have a value close to "0."

4. The user input processing method of claim 1, wherein the determining the delay time comprises, in response to the recognition reliability being less than a threshold, determining the delay time to have a value close to "0."

5. The user input processing method of claim 1, wherein the determining the delay time comprises:
   in response to the recognition reliability being greater than or equal to a first threshold, determining the delay time to have a value close to "0",
   in response to the recognition reliability being less than or equal to a second threshold, determining the delay time to have a value close to "0", and
   in response to the recognition reliability being less than the first threshold and greater than the second threshold, determining the delay time based on a distance between the recognition reliability and the predetermined threshold.

6. The user input processing method of claim 5, wherein when the distance decreases, the delay time increases, and when the distance increases, the delay time decreases.

7. The user input processing method of claim 5, wherein the determining whether the function is to be performed comprises, in response to the recognition reliability being greater than or equal to the predetermined threshold, determining whether the function is to be performed as the first value, and
   in response to the recognition reliability is less than the predetermined threshold, determining whether the function is to be performed as the second value.

8. The user input processing method of claim 1, wherein the determining the delay time comprises, in response to the recognition reliability being less than a first threshold and greater than a second threshold, determining the delay time to be a predetermined value.

9. The user input processing method of claim 1, wherein the determining whether the function is to be performed comprises, in response to the recognition reliability being greater than or equal to the predetermined threshold, determining whether the function is to be performed as the first value.

10. The user input processing method of claim 9, wherein the determining whether the function is to be performed further comprises, in response to the recognition reliability being less than the predetermined threshold, determining whether the function is to be performed as the second value.

11. The user input processing method of claim 9, wherein the controlling comprises, in response to whether the function is to be performed being determined as the first value indicating positiveness, at least one of:
    performing the function after the delay time has elapsed; and
    maintaining, during a waiting time, a state when the function is performed, the state enabling return to a state before the function was performed.

12. The user input processing method of claim 1, further comprising:
    feeding back to the user at least one of a remaining delay time and whether the function is to be performed, during the delay time.

13. The user input processing method of claim 1, wherein the additional input associated with whether the function is to be performed comprises at least one of:
    an input to confirm whether the function is to be performed; and
    an input to change whether the function is to be performed.

14. The user input processing method of claim 1, further comprising:

in response to the additional input associated with whether the function is to be performed being received via the interface, controlling the function based on the additional input associated with whether the function is to be performed, instead of waiting until the delay time has elapsed.

15. The user input processing method of claim 1, further comprising:
in response to the additional input associated with whether the function is to be performed being received via the interface, updating at least one of a first parameter and a second parameter based on the recognition reliability, the first parameter being used to determine the delay time, and the second parameter being used to determine whether the function is to be performed.

16. A user input processing method comprising:
acquiring recognition reliabilities of a user input, corresponding to a plurality of functions;
determining, based on the recognition reliabilities, delay times corresponding to the functions and whether the functions are to be performed, wherein the delay times are time intervals before initiating the corresponding functions;
performing at least one of the plurality of functions before the delay times are elapsed if at least one of the recognition reliabilities is greater than or equal to a first threshold;
providing a user with an interface, if the recognition reliabilities are lower than the first threshold, to confirm whether the functions are to be performed, wherein the interface indicates the user performing an additional input related with an initiation of the functions, wherein a duration of the interface corresponds to at least one of the delay times; and
controlling the functions based on whether the duration is elapsed and whether the functions are to be performed,
wherein the controlling the functions further comprises:
when the additional input associated with the interface is received from the user during the delay times, adjusting the first threshold,
wherein the interface provides the user a visualization of the delay times.

17. The user input processing method of claim 16, wherein a delay time of a function, which corresponds to a recognition reliability greater than the first threshold among the recognition reliabilities, is determined to have a value close to "0."

18. The user input processing method of claim 16, wherein a delay time of a function, which corresponds to a recognition reliability less than a second threshold among the recognition reliabilities, is determined to have a value close to "0."

19. The user input processing method of claim 16, wherein the determining the delay times comprises:
determining a delay time of a function, which corresponds to a recognition reliability greater than or equal to the first threshold among the recognition reliabilities, to have a value close to "0",
determining a delay time of a function, which corresponds to a recognition reliability less than or equal to a second threshold among the recognition reliabilities, to have a value close to "0", and
determining a delay time of a function, which corresponds to a recognition reliability that is less than the first threshold and greater than the second threshold among the recognition reliabilities, based on a distance between the recognition reliability and a third threshold.

20. The user input processing method of claim 16, wherein the determining whether the functions are to be performed comprises determining whether a function, which corresponds to a recognition reliability greater than or equal to a threshold among the recognition reliabilities, is to be performed as a first value indicating positiveness, and
determining whether a function, which corresponds to a recognition reliability less than the threshold among the recognition reliabilities, is to be performed as a second value indicating negativeness.

21. The user input processing method of claim 16, wherein the controlling comprises:
detecting a recognition reliability greater than a threshold, among the recognition reliabilities; and
performing a function corresponding to the detected recognition reliability after a delay time of the function corresponding to the detected recognition reliability.

22. The user input processing method of claim 16, wherein the controlling comprises:
detecting recognition reliabilities less than the first threshold and greater than a second threshold, among the recognition reliabilities;
determining a representative delay time based on delay times of functions corresponding to the detected recognition reliabilities; and
controlling the functions corresponding to the detected recognition reliabilities, based on the representative delay time and whether the functions corresponding to the detected recognition reliabilities are to be performed.

23. The user input processing method of claim 22, wherein the determining the representative delay time comprises:
determining, as the representative delay time, one of a minimum delay time, a maximum delay time, an intermediate delay time, and an average delay time, based on the delay times of the functions corresponding to the detected recognition reliabilities; and
determining, as the representative delay time, a delay time selected from among the delay times of the functions corresponding to the detected recognition reliabilities.

24. The user input processing method of claim 22, wherein the controlling the functions corresponding to the detected recognition reliabilities comprises:
providing the user with the interface used to select one of the functions corresponding to the detected recognition reliabilities;
performing a function corresponding to a selection input, when the selection input is received via the interface during the representative delay time; and
performing a function corresponding to a first value representing whether the function is to be performed, among the functions corresponding to the detected recognition reliabilities, when the selection input is not received during the representative delay time.

25. The user input processing method of claim 24, further comprising:
in response to the selection input being received, updating at least one of a first parameter and a second parameter, based on a recognition reliability of a first function corresponding to the selection input, the first parameter being used to determine a delay time of the first function, and the second parameter being used to determine whether the first function is to be performed;

in response to the selection input being received, updating at least one of a third parameter and a fourth parameter, based on the recognition reliability of the first function, the third parameter being used to determine a delay time of a second function not corresponding to the selection input, and the fourth parameter being used to determine whether the second function is to be performed; and in response to the selection input not being received during the representative delay time, updating at least one of a fifth parameter and a sixth parameter, the fifth parameter being used to determine a delay time of at least one function corresponding to the detected recognition reliabilities, and the sixth parameter being used to determine whether the at least one function is to be performed.

26. The user input processing method of claim 24, wherein the performing the function corresponding to the first value comprises, when a plurality of functions corresponding to the first value exist, performing a function corresponding to a greatest recognition reliability among the functions.

27. A non-transitory computer readable recording medium storing a program executable by a computer to perform the method of claim 1.

28. A user input processing apparatus comprising:
a processor configured to:
determine, based on a recognition reliability of a user input for a function, a delay time which is a time interval before initiating the function and whether the function is to be performed, the function being determined in advance;
provide a user with an interface to confirm whether the function is to be performed, wherein the interface indicates the user performing an additional input related with an initiation of the function, during the delay time;
control, after the delay time has elapsed, the function based on whether the function is to be performed,
wherein the processor is further configured to determine whether the function is to be performed as a first value indicating positiveness or as a second value indicating negativeness by comparing the recognition reliability with a predetermined threshold,
when the additional input associated with the interface is received from the user during the delay time, adjust the predetermined threshold, and
determine, if the delay time is elapsed without the additional input, whether to perform the function based on whether the function is to be performed being determined as the first value or the second value,
wherein the interface provides the user a visualization of the delay time.

29. A user input processing apparatus comprising:
a processor configured to:
acquire recognition reliabilities of a user input, corresponding to a plurality of functions;
determine, based on the recognition reliabilities, delay times corresponding to the functions, and whether the functions are to be performed, wherein the delay times are time intervals before initiating the corresponding functions;
perform at least one of the plurality of functions before the delay times are elapsed if at least one of the recognition reliabilities is greater than or equal to a first threshold;
provide a user with an interface, if the recognition reliabilities are lower than the first threshold, to confirm whether the functions are to be performed, wherein the interface indicates the user performing an additional input related with an initiation of the functions, wherein a duration of the interface corresponds to at least one of the delay times;
control the functions, based on whether the duration is elapsed and whether the functions are to be performed; and
when the additional input associated with the interface is received from the user during the delay times, adjust the first threshold,
wherein the interface provides the user a visualization of the delay times.

30. A user gesture input processing method comprising:
receiving a gesture performed by a user, the gesture corresponding to a pre-set function to be performed by a device;
determining a recognition reliability of the gesture;
based on the determined recognition reliability, setting a delay time which is a time interval before initiating the function and whether the function is to be performed;
providing the user with an interface to confirm whether the function is to be performed, wherein the interface indicates the user performing an additional input related with an initiation of the function, during the delay time; and
controlling the function based on whether the delay time is elapsed and whether the function is to be performed,
wherein the setting whether the function is to be performed comprises setting whether the function is to be performed as a first value indicating positiveness or as a second value indicating negativeness by comparing the recognition reliability with a predetermined threshold,
wherein the controlling the function further comprises:
when the additional input associated with the interface is received from the user during the delay time, adjusting the predetermined threshold, and
determining, if the delay time is elapsed without the additional input, whether to perform the function based on whether the function is to be performed being determined as the first value or the second value,
wherein the interface provides the user a visualization of the delay time.

31. The method of claim 30, wherein the setting comprises setting the delay time to have a value close to "0" and setting the function is to be performed, in response to the recognition reliability being greater or equal to a first threshold.

32. The method of claim 31, wherein the setting comprises setting the delay time to have a value close to "0" and setting the function is not to be performed, in response to the recognition reliability being less than or equal to a second threshold, which is less than the first threshold.

33. The method of claim 32, wherein the setting comprises variably setting the delay time and setting the function is to be performed, in response to the recognition reliability being less than the first threshold and greater than the predetermined threshold, the predetermined threshold being less than the first threshold and greater than the second threshold.

34. The method of claim 33, the setting comprises variably setting the delay time and setting the function is not to be performed, in response to the recognition reliability being greater than the second threshold and less than the predetermined threshold.

35. The method of claim 34, wherein the delay time is variably set according to a difference between the recognition reliability and the predetermined threshold.

\* \* \* \* \*